United States Patent
Sawal et al.

(10) Patent No.: US 12,360,835 B2
(45) Date of Patent: Jul. 15, 2025

(54) ENHANCED MANAGEMENT OF DEVICE HEALTH DATA

(71) Applicant: Dell Products L.P., Round Rock, TX (US)

(72) Inventors: Vinay Sawal, Fremont, CA (US); Sithiqu Shahul Hameed, Chennai (IN); Bryan D. Neumann, Garner, NC (US); Anne-Marie McReynolds, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 59 days.

(21) Appl. No.: 18/318,284

(22) Filed: May 16, 2023

(65) Prior Publication Data

US 2024/0385919 A1   Nov. 21, 2024

(51) Int. Cl.
*G06F 11/07* (2006.01)

(52) U.S. Cl.
CPC ...... *G06F 11/0757* (2013.01); *G06F 11/0709* (2013.01)

(58) Field of Classification Search
CPC .................. G06F 11/0757; G06F 11/0709
See application file for complete search history.

(56) References Cited

U.S. PATENT DOCUMENTS

2010/0332272 A1* 12/2010 Ong .................. G06Q 10/20
                                                            705/305

OTHER PUBLICATIONS

Wikipedia BMS page, retrieved from https://web.archive.org/web/20230514230523/https://en.wikipedia.org/wiki/Battery_management_system (Year: 2023).*

MRTECHLORD "Duracell power check" YouTube, https://www.youtube.com/watch?v=k6Gz5Gom5NI, Last Accessed May 8, 2023, 2 pages.

Unknown "Reliability engineering" Wikipedia, https://en.wikipedia.org/wiki/Reliability_engineering, Last Accessed May 8, 2023, 28 pages.

Unknown "Mean time between failures" Wikipedia, https://en.wikipedia.org/wiki/Mean_time_between_failures, Last Accessed May 8, 2023, 7 pages.

(Continued)

*Primary Examiner* — Yair Leibovich
(74) *Attorney, Agent, or Firm* — Amin, Turocy & Watson, LLP

(57) ABSTRACT

Health data relating to health of field replaceable units (FRUs) can be collected, determined, and managed. FRU can comprise a data health management component (DHMC) that can periodically or dynamically analyze sensor data relating to operational characteristics of the FRU received from sensors associated with components of or associated with the FRU, historical sensor data, or historical FRU health data, wherein the sensor data can indicate usage or accelerated usage of the components of the FRU. Based on such analysis, DHMC can determine or update an expected amount of time of remaining usable life of the FRU, which can take into account any accelerated usage of the FRU. DHMC can store, in a data store of the FRU, or present, via an interface of the FRU, information relating to the expected amount of time of remaining usable life of the FRU or other FRU health data.

20 Claims, 13 Drawing Sheets

(56) References Cited

OTHER PUBLICATIONS

Unknown "MTTF, MTBF, Mean Time Between Replacements and MTBF with Scheduled Replacements" Reliability Engineering Resources, https://www.weibull.com/hotwire/issue94/relbasics94.htm, Last Accessed May 8, 2023, 6 pages.
Abernethy "Reliability & Statistical Analysis for Predicting Life, Safety, Survivability, Risk, Cost and Warranty Claims" The New Weibull Handbook, 4th Edition, 2000, 12 pages.
"Electric components—Reliability—Reference conditions for failure rates and stress models for conversion (IEC 61709:2011 (EQV)" NSAI, 2011, 15 pages.
"Electric components—Reliability—Reference conditions for failure rates and stress models for conversion" International Electrotechnical Commission, Feb. 2017, 38 pages.
"MIL-STD-810G, Department of Defense Test Method Standard Environmental Engineering Considerations and Laboratory Tests", http://www.everyspec.com, Oct. 31, 2008, 804 pages.
EPSMA Techincal Committee "Reliability—Guidelines to Understanding Reliability Prediction" European Power Supply Manufacturers Association, Jun. 24, 2005, 29 pages.

\* cited by examiner

ENHANCED MANAGEMENT OF DEVICE HEALTH DATA

BACKGROUND

Computer systems can comprise various types of components. These components can include field replaceable units (FRUs), such as, for example, power supply units, fan trays, or other types of electronic or electromechanical devices. An FRU can have a certain amount of usable life (e.g., rated or nominal usable life), and can be subject to wear and tear through use, exposure to environmental conditions, and/or other factors. While FRUs typically can be quite reliable and can have a relatively low failure rate, FRUs can fail, usually at or around the end of their usable life.

The above-described description is merely intended to provide a contextual overview regarding computer system components, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise, receiving, by a device comprising a processor, sensor data relating to a group of operational characteristics of the device from a group of sensors associated with a group of components associated with the device. The method also can comprise: based on a result of analyzing the sensor data, determining, by the device, an expected amount of time of remaining usable life of the device. The method further can comprise presenting, by the device, information relating to the expected amount of time of remaining usable life of the device via an interface of the device, independently of determining whether the interface is receiving electrical power.

In certain embodiments, the disclosed subject matter can comprise a device that can include a memory that can store computer executable components, and a processor that can execute computer executable components stored in the memory. The computer executable components can comprise a device health management component that can determine a predicted amount of time of remaining usable life of a device based on a result of an analysis of sensor information relating to a group of operational attributes of the device received from a group of sensors associated with a group of components associated with the device. The computer executable components also can comprise an interface component that can present information relating to the predicted amount of time of remaining usable life of the device, independent of a determination of whether the device is connected to an external device that is external to the device.

In still other embodiments, the disclosed subject matter can comprise a non-transitory machine-readable medium, comprising executable instructions that, when executed by a processor, can facilitate performance of operations. The operations can comprise determining an expected amount of time of remaining operational life of a field replaceable unit based on a result of analyzing sensor information relating to a group of operational attributes of the field replaceable unit and obtained from a group of sensors associated with a group of components associated with the field replaceable unit. The operations also can comprise displaying, via an interface of the field replaceable unit, information relating to the expected amount of time of remaining operational life of the field replaceable unit, regardless of whether the interface is receiving electrical power.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
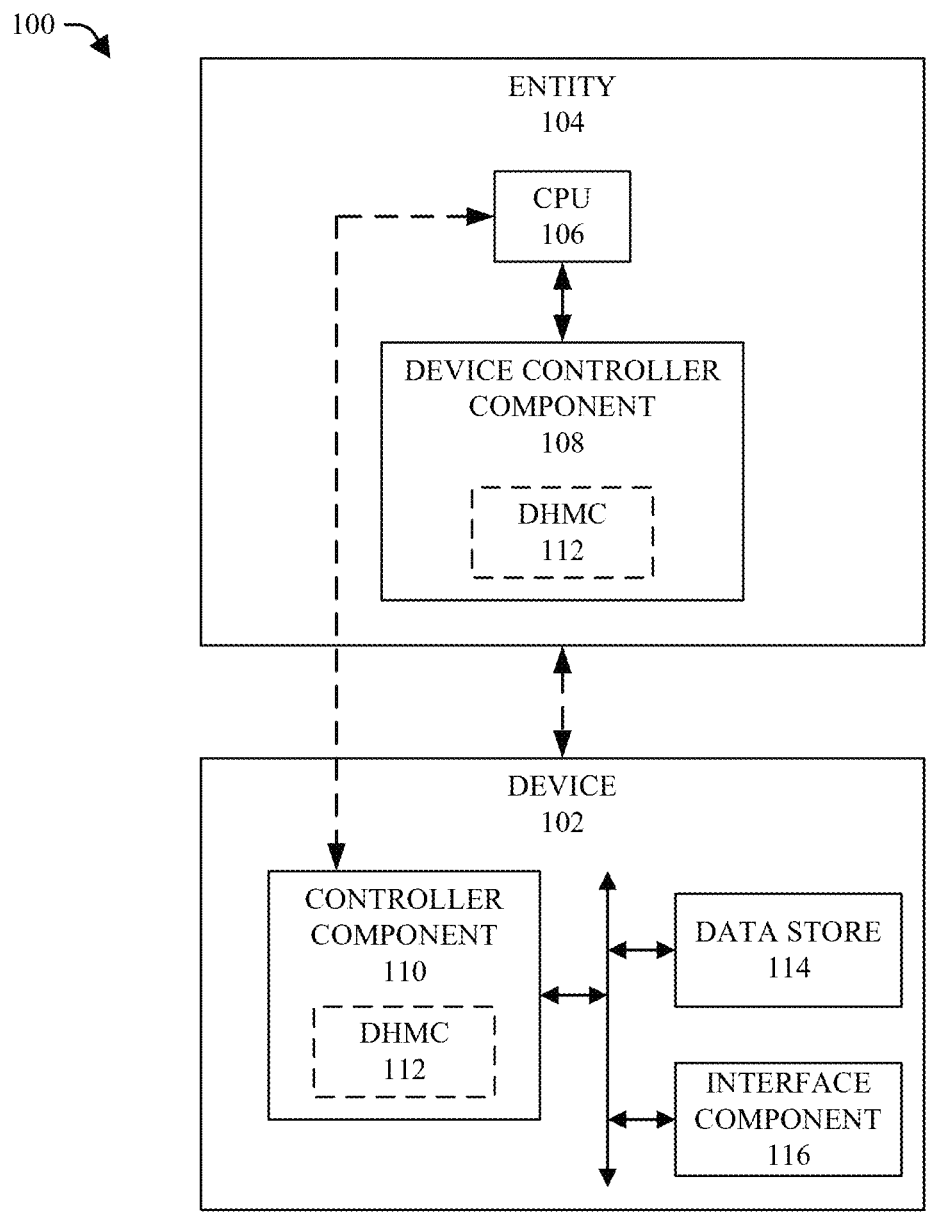
FIG. 1 illustrates a block diagram of a non-limiting example system that can desirably manage and/or present data relating to the health status and/or remaining usable life of a device, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to computer systems and their components, such as field replaceable units (FRUs), for example, to enhanced management of device health data of devices (e.g., FRUs) of computer systems. Computer systems can comprise various types of components (e.g., devices). These components can include FRUs, such as, for example, power supply units, fan trays, or other types of electronic or electromechanical devices. An FRU can have a certain amount of usable life (e.g., rated or nominal usable life), and can be subject to wear and tear through use, exposure to environmental conditions, and/or other factors. While FRUs typically can be quite reliable and can have a relatively low failure rate, FRUs can fail, usually at or around the end of their usable life, which can be measured in operating time.

Under existing standards, the usable life of an FRU can be determined by quantifying reliability of the FRU in terms of mean time between failure (MTBF) and/or mean time to repair (MTTR), which can represent the statistical average of how long a set of FRUs should operate before a failure is expected in that set. However, MTBF and MTTR can suffer from various shortcomings as a candidate for predicting a usable life of a particular FRU. For instance, MTBF and MTTR are statistical approximations that can provide prediction for a population of FRUs, but they cannot provide any specific information (e.g., specific operational, health, or life expectancy information) for any individual FRU. Also, reliability or health statistics for MTBF and MTTR generally can be calculated under ideal environmental and operational conditions for FRUs, and such reliability or health statistics do not take into consideration or account for real life sub-optimal operating environments, such as environments where an FRU may be subject to insufficient cooling, excessive dust, or high vibration, and/or accelerated wear on an FRU (e.g., accelerated wear on a fan due to running the fan at maximum revolutions per minute (RPM) for a long amount of time). It is well known that these factors as well as certain other factors can accelerate the wear and tear on an electromechanical system (e.g., an electromechanical system of an FRU), and consequently, can reduce the usable life of the electromechanical system.

FRUs sometimes can be stockpiled while waiting to be used (e.g., stored on a shelf and available for installation and use in a computer system or other device). In a stockpile of old and/or new, lightly used and/or heavily used, FRUs, existing techniques and devices do not provide a desirable (e.g., effective, efficient, suitable, or reliable) way of determining or figuring out how much usable life is remaining in each FRU of the stockpile. Without such information relating to the particular remaining usable life of each particular FRU, selecting an FRU for installation in a computer system or other device (e.g., installation in a chassis of a computer system or other device) may be done by mere chance, where the selected FRU may have relatively little usable life remaining or may have a higher amount of usable life remaining. This can be undesirable, as there can be significant potential for workload disruption, data traffic loss, network re-convergence, and/or other issues that can be very undesirable activities due to the potential of selecting an FRU for installation that has a relatively small amount of usable life remaining.

It can be desirable (e.g., wanted, necessary, or otherwise desirable) to overcome the deficiencies of existing techniques and devices, and enhance device (e.g., FRU) design so that individual actual usage statistics can be collected, stored, processed, and displayed in a suitable and useful (e.g., easy-to-read) manner.

To that end, techniques for desirably (e.g., efficiently, suitably, or optimally) collecting, determining (e.g., calculating, deriving, or otherwise determining), and managing health data relating to the health of devices (e.g., field replaceable units (FRUs)) are presented. The disclosed techniques, systems, methods, and processes can enhance (e.g., improve or optimize) device design (e.g., over existing FRU designs) so that individual actual usage statistics, including statistics relating to accelerated usage (e.g., accelerated usage that can result in accelerated or increased wear and tear) of the device, can be collected, stored, processed, and displayed (e.g., collected, stored, processed, and/or displayed in real time or near real time) in a suitable and useful (e.g., easy-to-read) manner. In accordance with various embodiments, and/or at various times, the device can be installed in another device or system, or the device can be uninstalled and/or stored for potential future use (e.g., stored on a shelf or in a storage room, or otherwise stored for potential future use, such as installation in another device or system).

The device can comprise or be associated with a data health management component (DHMC) that can regularly, periodically, or dynamically receive (e.g., receive regularly or in real time or substantially real time) sensor data (e.g., sensor and/or telemetric data) relating to (e.g., representative of, indicative of, representative or indicative of measurements of or relating to) operational characteristics (e.g., current, voltage, temperature, humidity, revolutions per minute (RPM), or other types of operational characteristics) of the device from respective sensors associated with respective components of or associated with the device. The operational characteristics can be, can comprise, or can relate to lifetime prediction factors (LTPFs) associated with the device, wherein respective (e.g., different) types of devices can have respective groups of LTPFs. The sensor data can indicate, or facilitate determination of, usage or accelerated usage (e.g., amount of time of usage and/or amount of time of accelerated usage) of the components of the device. The DHMC can store the sensor data and information derived (e.g., determined or calculated) from the sensor data in a data store of the device.

The DHMC regularly, periodically (e.g., at each periodic time, such as each hour or other desired time interval), or dynamically analyze the sensor data (e.g., the sensor data received or collected since the last analysis), historical sensor data (e.g., sensor data from a previous time period(s)), historical device health data (e.g., previous amount of usage time of the device, previous determinations regarding the expected remaining usable life of the device, or the components thereof), and/or other data (e.g., device-related data indicative of threshold (e.g., threshold maximum or threshold minimum) or nominal levels or rated values associated with operational characteristics or components associated with the device and/or expected or average lifetime expectancy or usable life of the device, or the components thereof). Based at least in part on the results of the analysis of the sensor data, the historical sensor data, the historical device health data, and/or the other data, the DHMC can track and/or determine an amount of usage and/or an amount of time of accelerated usage of the device or a component thereof, or with regard to an operational characteristic associated therewith. Accelerated usage can be due to operation of the device, or a component thereof, with regard to an operational characteristic(s) relating thereto, at a level (e.g., at a data value(s), such as a value of sensor data or device health data) relating to the operational characteristic(s) that was determined to be outside of a threshold or nominal level(s) or rated value(s) (e.g., above (or below) a threshold data value, or outside of or not within a threshold range of data values) associated with (e.g., applicable to) the operational characteristic(s). Accelerated usage of the device can result in accelerated, increased, or excessive wear and tear on the device, or components thereof, and the DHMC can track and/or determine the amount of accelerated usage of the device to facilitate accounting for such accelerated usage when determining the health status or life expectancy status (e.g., remaining life expectancy) of the device. In some embodiments, the sensor data also indicate insertion or removal of the device into or from another device or system. The DHMC can track and maintain a count of insertions or removals of the device into or from another device(s) or system(s), which can be factored into the determination of the usage or accelerated usage of the device by the DHMC.

The DHMC can update (e.g., increment) the amount of total usage of the device based at least in part on (e.g., as a function of) the amount of usage and/or the amount of accelerated usage (if any) of the device, since the last device usage determination, and/or the previous amount of total usage of the device (e.g., as previously determined by the DHMC during the previous device usage or device health determination). For instance, the DHMC can increment or increase the total amount of usage of the device from the previous amount of total usage of the device up by the amount of usage of the device (e.g., the amount of ordinary usage and accelerated usage of the device) that was determined for the most recent time period. Also, based at least in part on such analysis, DHMC can determine or update an expected amount of time of remaining usable life (e.g., remaining life expectancy) of the device, which also can take into account any accelerated usage of the device. For instance, the DHMC can determine or update an expected amount of time of remaining usable life of the device based at least in part on (e.g., as a function of) the rated, nominal, or expected amount of usable life of the device and the total amount (e.g., updated total amount) of usage of the device (e.g., rated, nominal, or expected amount of usable life of the device minus the total amount of usage of the device up to the current time).

The DHMC can store, in a data store of or associated with the device, information (e.g., device health data) relating to the expected amount of time of remaining usable life of the device and/or other device health data of the device (e.g., total amount of usage time, amount of ordinary usage time, amount of accelerated usage time, sensor data or data derived therefrom relating to operational characteristics, and/or other desired information relating to the device). The DHMC also can present, via an interface of or associated with the device, information relating to the expected amount of time of remaining usable life of the device and/or the other device health data of the device, for example, to a user viewing or perceiving the interface. In some embodiments, even if the device or interface is not receiving electrical power (e.g., due to not being connected to a power source or a battery power source has run out of power), the interface still can maintain and present the most recent device health data of the device (e.g., the device health data last presented by the interface), such as described herein.

These and other aspects and embodiments of the disclosed subject matter will now be described with respect to the drawings.

Referring now to the drawings, FIG. 1 illustrates a block diagram of a non-limiting example system 100 that can desirably (e.g., suitably, efficiently, or optimally) manage and/or present data relating to the health status and/or remaining usable life of a device, in accordance with various aspects and embodiments of the disclosed subject matter. The system 100 can comprise a device 102 (e.g., FRU) that can be utilized with an entity 104 (e.g., another device or system). For instance, the device 102 can be installed (e.g., inserted or seeded) in or removed (e.g., detached or unseeded) from the entity 104, wherein the device 102 can provide desired functionality or services to the entity 104. The entity 104 can be or can comprise, for example, a computer system, a node, a network, and/or other type of entity (e.g., other type of computing, communication, or network entity). The device 102 can be or can comprise, for example, a power supply unit, a fan tray unit, a fiber optic connector device, a network interface card (NIC), a data storage device, an electronic device, a mechanical device, an electromechanical device, or other type of device or FRU.

In some embodiments, the entity 104 can comprise a central processing unit (CPU) 106 that can perform processing functions and operations, and other components (e.g., interfaces, network components, data storage components, or other components) that can perform respective functions and operations, of the entity 104. In certain embodiments, the entity 104 also can comprise a device controller component 108 (e.g., FRU controller) that can process data (e.g., data, instructions, or code), perform operations, and/or control operation of the device 102 and/or other devices (e.g., other FRUs) if and when the device 102 and/or the other devices are associated with (e.g., connected to or installed in, or otherwise associated with) the entity 104.

In some embodiments, the device 102 can comprise a controller component 110 (e.g., a processor, controller unit, or microcontroller unit) that can process data (e.g., data, instructions, or code), perform operations, and can control operation of the device 102, such as described herein. As disclosed, it can be desirable (e.g., wanted, necessary, or otherwise desirable) to enhance device (e.g., FRU) design so that individual actual usage statistics of or associated with the device 102 can be collected, stored, processed, and displayed in a suitable and useful (e.g., easy-to-read) manner. To that end, in accordance with various embodiments, the device 102 can comprise or can be associated with a device health management component (DHMC) 112, or a portion thereof, that can collect, store, process, and present (e.g., display) actual usage statistics, including device health data relating to the device 102. In some embodiments, the DHMC 112, or a portion thereof, can be situated in the device controller component 108 (e.g., as part of the host CPU system of the entity 104). In other embodiments, the DHMC 112, or a portion thereof, can be situated in the device 102 (e.g., can be part of or associated with the controller component 110). In still other embodiments, the DHMC 112, or a portion thereof, can be a standalone component that can be associated with the device 102 and/or device controller component 108.

The DHMC 112 can receive, collect, or obtain sensor, telemetric, and/or other data associated with the device 102 on a desired time basis (e.g., in regular, real time, or substantially real time, or on another desired time basis), can aggregate and process such data, can store such data, and/or can present, or facilitate presentation of, such data or other data derived (e.g., determined or calculated) from such data, or notifications (e.g., notification messages, alarms, or indicators) or indicators (e.g., visual or audio indicators), such as described herein. For instance, the DHMC 112 can determine a remaining usable life (e.g., life expectancy or remaining life expectancy) of individual components of the device 102 and an aggregated (e.g., overall) remaining usable life of the device 102, and/or other device health data (e.g., amount of time of usage of the device 102, including or accounting for accelerated usage of the device, or a component thereof), based at least in part on the results of analyzing the data (e.g., sensor, telemetric, and/or other data), and can present or facilitate presentation of, information relating to the health of the device 102 (e.g., remaining usable life of an individual component(s) of the device 102, aggregated remaining usable life of the device 102, and/or other device health data, notifications, and/or indicators), such as described herein.

Figure 2:
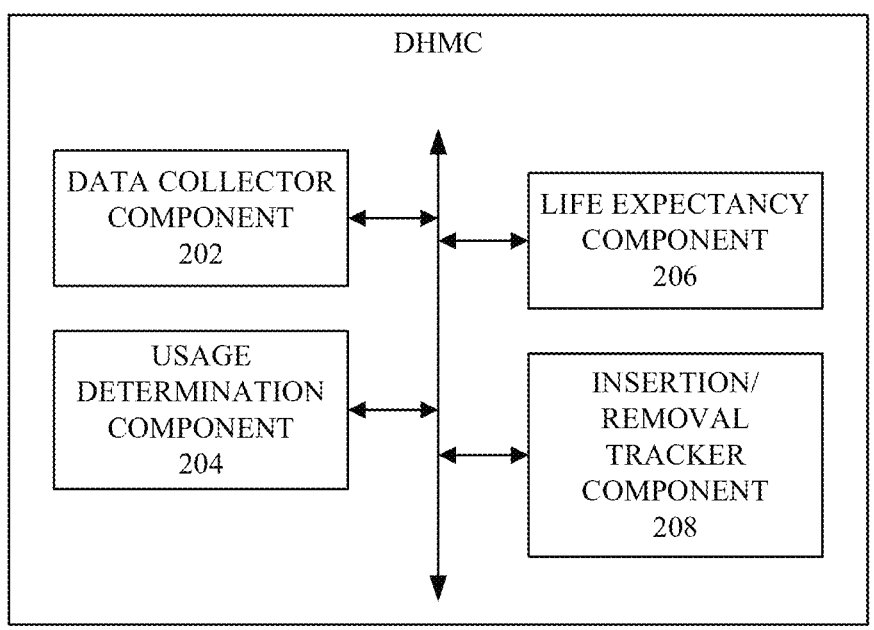
FIG. 2 illustrates a block diagram of an example device, comprising or associated with a device health management component (DHMC), in accordance with various aspects and embodiments of the disclosed subject matter.
Figure 3:
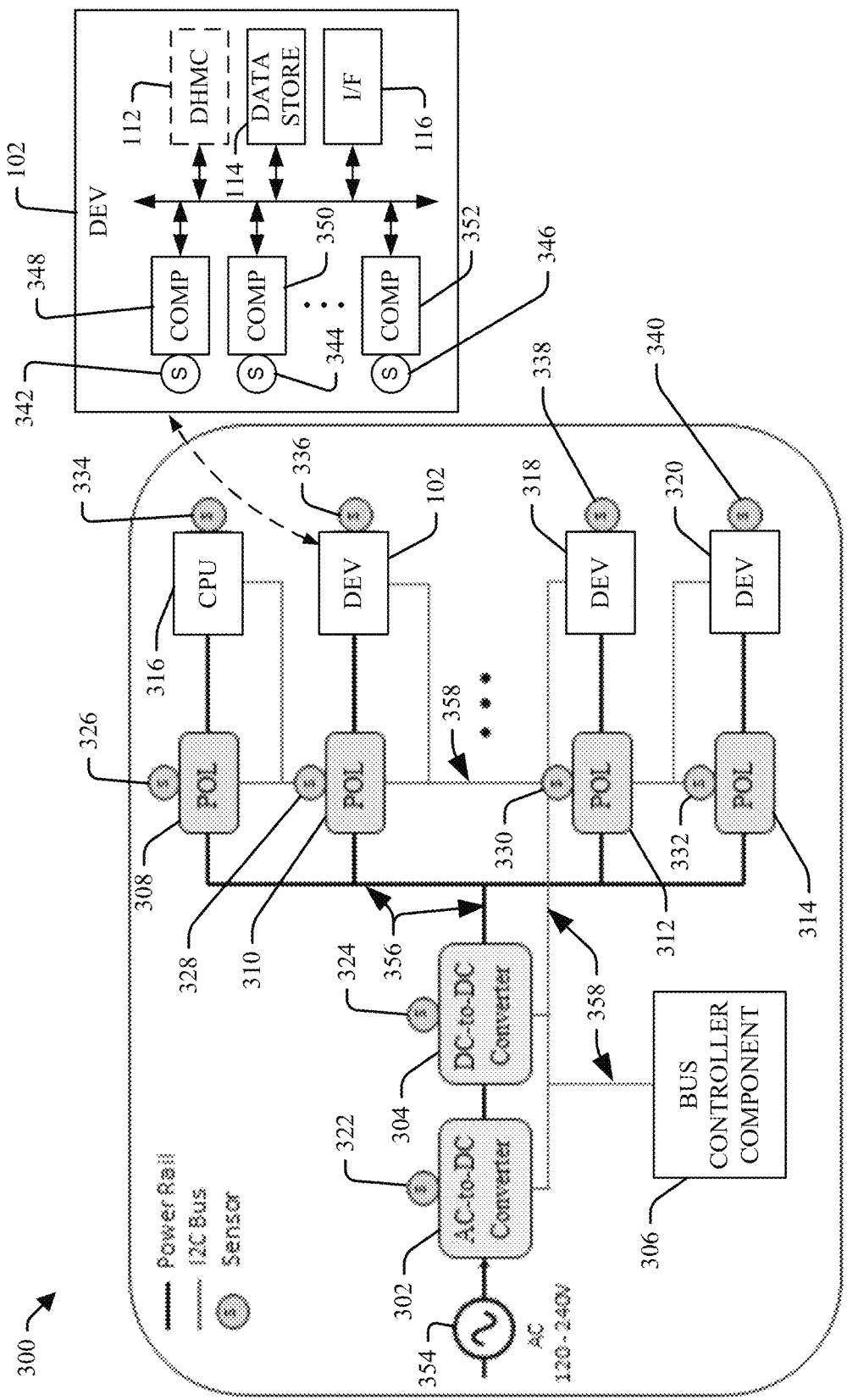
FIG. 3 depicts a block diagram of a non-limiting example system that can comprise sensors associated with various system components, including devices, to facilitate collection of data relating to characteristics and usage associated with the devices, in accordance with various aspects and embodiments of the disclosed subject matter.

Referring to FIGS. 2 and 3 (along with FIG. 1), FIG. 2 depicts a block diagram of the device 102, comprising or associated with the DHMC 112, and FIG. 3 depicts a block diagram of a non-limiting example system 300 that can comprise sensors associated with various system components, including devices (e.g., FRUs), to facilitate collection of data relating to characteristics (e.g., operational, environmental, and/or other characteristics) and usage associated with the devices, in accordance with various aspects and embodiments of the disclosed subject matter. The system 300 can comprise various components, including, for example, an alternating current (AC)-to-direct current (DC) converter component 302, a DC-to-DC converter component 304, a bus controller component 306, point-of-load (POL) converter components 308, 310, 312, and 314, a CPU 316, a desired number of devices (e.g., FRUs), such as device (DEV) 102, device 318, and device 320, and/or other desired components. To facilitate learning or determining operational characteristics and usage associated with the device 102, device 318, and/or device 320, the system 300 also can comprise a group of sensors that can comprise respective sensors (S) (e.g., sensors 322, 324, 326, 328, 330, 332, 334, 336, 338, 340, 342, 344, and/or 346) that can be associated with respective components (e.g., AC-to-DC converter component 302, DC-to-DC converter component 304, POL converter components 308, 310, 312, and 314, CPU 316, device 102, device 318, device 320, and/or various components, such as component (COMP) 348, component 350, and/or component 352 of the device 102) of the system 300.

The AC-to-DC converter component 302, DC-to-DC converter component 304, POL converter components 308, 310, 312, and 314, CPU 316, device 102, device 318, and/or device 320 can be electrically connected to a power source 354 and/or each other via a power rail 356 that can be connected to those respective components or devices. In some embodiments, the system 300 can receive power (e.g., AC power) of a certain higher line voltage (e.g., 120 to 240 volts (V), or other relatively higher voltage) from the power source 354 (e.g., AC power source), although, in other embodiments, the power may be DC power from a DC power source. When the power source is an AC power source, the AC-to-DC converter component 302 can be a power supply unit (PSU) that can receive the power at the certain higher line voltage from the AC power source 354 (e.g., from the utility or electrical grid, or other AC power source) and can convert the AC voltage source into DC at a relatively lower voltage (e.g., 48 V DC, or other relatively lower DC voltage level).

The DC-to-DC converter component 304 can receive the relatively lower voltage (e.g., 48 V DC, or other relatively lower DC voltage level) from the AC-to-DC converter component 302 and can convert such DC voltage into voltage ranges (e.g., lower DC voltage ranges) that can be desirable (e.g., suitable, wanted, or optimal) for inputting or supplying to the POL converter components 308, 310, 312, and 314. The POL converter components 308, 310, 312, and 314 can be step down DC-to-DC converters that can receive the power (e.g., power at the desirable lower DC voltage ranges) from the DC-to-DC converter component 304, and can provide (e.g., supply or input) DC power at a desirably lower DC voltage (e.g., a stepped down DC voltage) to individual circuit blocks or components (e.g., loads in the system 300), such as, for example, the CPU 316, memory, neural processing unit (NPU), devices (e.g., devices 102, 318, and/or 320), and/or other components or devices of the system 300.

The AC-to-DC converter component 302, DC-to-DC converter component 304, bus controller component 306, POL converter components 308, 310, 312, and/or 314, devices 102, 318, and/or 320, and the group of sensors (e.g., 322 through 346) also can be communicatively connected to the CPU 316 and/or each other via a bus component 358 that can communicate information between those respective components or devices and the CPU 316 and/or each other. In some embodiments, the bus component 358 can be a I2C bus, and, in other embodiments, the bus component 358 can be another type of bus that can facilitate (e.g., enable) communication between those respective components or devices and the CPU 316 and/or each other. The bus controller component 306 can manage (e.g., control) or facilitate communication of information between those respective components or devices and the CPU 316 and/or each other via the bus component 358. In some embodiments, the bus controller component 306 can employ I2C controller logic, and, in other embodiments, the bus controller component 306 can employ another type of bus controller logic, to facilitate managing or facilitating communication of information between those respective components or devices and the CPU 316 and/or each other via the bus component 358.

With further regard to the group of sensors, the respective sensors (e.g., sensors 322 through 346) can comprise, for example, one or more current sensors, voltage sensors, power sensors, vibration sensors, electromagnetic interference (EMI) sensors, frequency sensors, revolution sensors (e.g., RPM sensors), connection or insertion/removal sensors, thermal or temperature sensors, humidity sensors, dust or particle sensors, air pressure or barometric pressure sensors, and/or other desired types of sensors. A current sensor can sense (e.g., detect) or measure current (e.g., current level or amount) associated with a device (e.g., 102) or other component, a voltage sensor can sense or measure voltage (e.g., voltage level) associated with the device (e.g., 102) or other component, a power sensor can sense or measure an amount of power associated with the device (e.g., 102) or other component, a vibration sensor can sense or measure a level of vibration associated with the device (e.g., 102) or other component, an EMI sensor can sense or measure a level of EMI associated with the device (e.g., 102) or other component, a frequency sensor can sense or measure a frequency associated with the device (e.g., 102) or other component, a revolution sensor can sense or measure revolutions (e.g., RPMs) associated with the device (e.g., a fan of a fan tray unit) or other component, a connection or insertion/removal sensor can sense a connection, insertion, or removal of the device (e.g., 102) to or from another device or system, a thermal or temperature sensor can sense or measure a thermal or temperature level associated with the device (e.g., 102) or other component, a humidity sensor can sense or measure a humidity level associated with the device (e.g., 102) or other component, a dust or particle sensor can sense or measure an amount or level of dust or particles associated with the device (e.g., 102) or other component, and an air pressure or barometric pressure sensor can sense or measure an air pressure or barometric pressure level associated with the device (e.g., 102) or other component.

Periodically (e.g., each hour or at the end of each interval of a desired time length) or dynamically (e.g., dynamically in response to an event or a request), the DHMC 112, employing a data collector component 202, can receive (e.g., obtain or collect) respective sensor data from the respective sensors (e.g., sensors 322 through 346) and/or other desired data related to the health of the device 102 from other data sources of or associated with the device 102. The respective sensor data can relate to respective operational characteristics (e.g., attributes), LTPFs, operational parameters, and/or environmental characteristics or parameters associated with the device 102 and its components. Operational characteristics and/or parameters can comprise or can relate to, for example, voltage, current, frequency, temperature, and/or other operational characteristics and/or parameters associated with the device. Some of the sensor data also can relate to the insertion or removal of the device 102 into or from the entity 104 or another entity (e.g., another system or device). Environmental characteristics or parameters can comprise or can relate to humidity, particle or dust level, EMI, vibration, and/or other environmental characteristics or parameters associated with the device 102. The data collector component 202 can store the sensor data in a data store 114 of or associated with the device 102.

In some embodiments, the DHMC 112, employing a usage determination component 204, can analyze the sensor data and/or other data relating to the device 102. Based at least in part on the results of analyzing the sensor data and/or other data, the usage determination component 204 can determine the amount of usage (e.g., the length of time of usage, or amount of runtime) of the device 102, and/or components (e.g., components 348, 350, and/or 352) thereof, since the previous (e.g., last) time the amount of usage of the device 102 was evaluated or determined. The usage determination component 204 can increment the amount of usage of the device 102 (e.g., from the previous amount of usage of the device) based at least in part on the determined amount of usage of the device 102, since the previous (e.g., last) time the amount of usage of the device 102 was evaluated or determined. For instance, usage determination component 204 can read the previous amount of usage of the device 102 from the data store 114, and can determine (e.g., calculate) the amount of usage (e.g., amount of runtime) of the device 102 since it was first utilized based at least in part on (e.g., as a function of) the determined (e.g., most recently determined) amount of usage of the device 102 and the previous amount of usage of the device 102 (e.g., determined the amount of usage of the device 102 since it was first utilized as equal to the most recently determined amount of usage of the device 102 plus the previous amount of usage of the device 102).

As part of the analysis of the sensor data and/or other data (e.g., as collected by the data collector component 202 and/or read from the data store 114), the DHMC 112, employing a life expectancy component 206, can analyze the sensor data (which can include or relate to LTPF data) and/or other data associated with the device 102 to facilitate determining whether there has been any accelerated usage of the device 102, or component (e.g., component(s) 348, 350, and/or 352) thereof, the amount (if any) of accelerated usage of the device 102, or component (e.g., component(s) 348, 350, and/or 352) thereof, and/or the life expectancy (e.g., remaining usable life or remaining life expectancy) of the device 102.

In certain embodiments, to facilitate detecting and tracking accelerated usage of the device 102, the life expectancy component 206 can detect or determine whether there is sensor data or other data relating to a characteristic (e.g., operational, environmental, or other characteristic associated with the device 102) that has a value (e.g., sensor or LTPF value) that satisfies (e.g., exceeds, above, or outside of; or, alternatively, below or outside of a range of) a threshold value (or a threshold value range) associated with (e.g., applicable with respect to) the characteristic, wherein the threshold value can be based at least in part on specifications or qualities associated with the device 102, and wherein satisfying the threshold value can indicate that the device 102 is being operated under a condition that is beyond or outside of rated, nominal, or normal operating conditions or is otherwise being subject to a condition (e.g., environmental condition) that is beyond or outside of rated, nominal, or normal conditions, in accordance with (e.g., as indicated or specified by) the defined device health management criteria. If, based at least in part on the results of analyzing the sensor data or other data, the life expectancy component 206 detects or determines that the sensor data or other data (e.g., data value of the sensor data or other data) relating to the characteristic satisfies the threshold value associated with the characteristic, the life expectancy component 206 can track an amount of time that the device 102, or component thereof, is operating under, or is subject to, a condition where the sensor data or other data relating to the characteristic satisfies the threshold value associated with the characteristic. For instance, the life expectancy component 206 can initiate (e.g., start) a timer to track the amount of time that the sensor data or other data relating to the characteristic satisfies the threshold value, can timestamp or save the time (e.g., the moment in time) that the sensor data or other data relating to the characteristic was detected or determined to satisfy the threshold value, or can otherwise track the amount of time that the sensor data or other data relating to the characteristic satisfies the threshold value. Based at least in part on subsequent sensor data or other data relating to the characteristic, the life expectancy component 206 can detect or determine if and when the subsequent sensor data or other data no longer satisfies the threshold value (e.g., is at or below a high or maximum threshold value or within the threshold value range; or alternatively, is above a minimum threshold value) relating to the characteristic, which can indicate that the device 102, or component thereof, is operating under a rated or normal condition and is no longer operating under or subject to a condition outside of the rated or normal condition with regard to the characteristic, in accordance with the defined device health management criteria. The life expectancy component 206 can perform such accelerated usage detection and tracking with regard to each desired characteristic (e.g., LTPF) associated with the device 102, or component thereof.

If the life expectancy component 206 detected or determined that there was accelerated usage associated with a characteristic associated with the device 102 and such accelerated usage has ended or it is a time that there is a life expectancy analysis being performed, the life expectancy component 206 can determine an amount of time that the accelerated usage associated with the characteristic has spanned (e.g., has been ongoing) based at least in part on (e.g., as, or as a function of) the amount of time the device 102, or component thereof, has been tracked as, or determined to be, operating under or subject to a condition outside of the rated or normal condition with regard to the characteristic (e.g., has been determined to satisfy the threshold value associated with the characteristic). The life expectancy component 206 can determine an amount of time of accelerated usage of the device 102, or component thereof, based at least in part on (e.g., as a function of) the amount of time that the device 102, or component thereof, has been operating under or subject to accelerated usage associated with the characteristic and an accelerated usage factor associated with the characteristic (e.g., the amount of time of accelerated usage multiplied by the accelerated usage factor associated with the characteristic), in accordance with the defined device health management criteria. The accelerated usage factor typically can be a desired (e.g., wanted, suitable, or optimal) value that is greater than 1.0, in accordance with (e.g., as indicated or specified by) the defined device health management criteria. The life expectancy component 206 can store the amount of time (e.g. the runtime value) of accelerated usage associated with the characteristic and/or the device 102, along with (e.g., in association with, as mapped to, or as linked to) information relating to the characteristic (e.g., an identifier of the characteristic) in the data store 114.

Based at least in part on the results of analyzing the sensor data and/or other data, including analysis and determination regarding amount of time of ordinary (e.g., rated or normal) usage of the device 102 and/or amount of time (if any) of accelerated usage of the device 102, or component thereof, the life expectancy component 206 can determine a total amount of time of usage of the device 102 based at least in part on (e.g., as a function of) the amount of time of ordinary usage of the device 102 and/or the amount of time (if any) of the accelerated usage of the device 102, or component thereof (e.g., the amount of time of ordinary usage plus the amount of time of the accelerated usage of the device 102).

In certain embodiments, with regard to each component or one or more desired components (e.g., component(s) 348, 350, and/or 352) of the device 102, the life expectancy component 206 can determine a remaining usable life (e.g., remaining amount of time of usable life) of the component based at least in part on (e.g., as a function of) an expected amount of usable life of the component and the total amount of time of usage of the component to that point (e.g., the expected amount of usable life of the component minus the total amount of time of usage of the component to that point). To facilitate such determination of remaining usable life of the component, the life expectancy component 206 can retrieve information relating to the expected (e.g., predicted, rated, or normal) amount of usable life of the component and/or the device 102 from the data store 114 or another desired data source.

The life expectancy component 206 can aggregate the respective determinations of remaining usable life of respective components of the device 102, and can determine a remaining usable life of the device 102 at that point based at least in part on (e.g., as a function of) the respective determinations of the remaining usable life of the respective components of the device 102. In some embodiments, the life expectancy component 206 can aggregate the respective determinations of remaining usable life of respective components of the device 102, and can determine a remaining usable life of the device 102 at that point as being the lowest amount of time of remaining usable life of a component of the device 102, relative to (e.g., as compared to) other relatively higher amounts of time of remaining usable life associated with other components of the device 102, when doing so is in accordance with the defined device health management criteria. In other embodiments, the life expectancy component 206 can aggregate the respective determinations of remaining usable life of respective components of the device 102, and can determine the remaining usable life of the device 102 at that point based at least in part on the respective amounts of time of remaining usable life of the respective components of the device 102 and respective weight factors that can be applied to the respective amounts of time of remaining usable life of the respective components of the device, when doing so is in accordance with the defined device health management criteria. The DHMC 112 can express, indicate, or present the remaining usable life of the device 102, or a component thereof, as an amount of time (e.g., in hours or other unit of time) of remaining usable life of the device 102 or component, as a percentage of remaining usable life of the device 102 or component as determined as a function of the amount of time of remaining usable life of the device 102 or component in relation to the amount (e.g., expected, predicted, rated, or normal amount) of usable life of the device 102 or component, or as otherwise desired.

As a non-limiting example of determining accelerated usage associated with a characteristic (e.g., an LTPF) associated with the device 102 and total usage associated with a device 102 that includes normal usage and accelerated usage of the device 102, TABLE 1 presents information relating to various characteristics associated with the device 102, as determined based at least in part on analysis of example sensor data, associated with the device 102 and received from the respective sensors (e.g., sensors 322 through 346), or other data associated with the device 102 (e.g., device specification data relating to specifications, ratings or thresholds associated with characteristics, acceleration factors associated with characteristics, or other data).

TABLE 1

| Char | Thresh | Usage within Thresh | Usage beyond Thresh | Acc Factor | Acc Usage | Total Usage |
|---|---|---|---|---|---|---|
| Voltage | 12 V | 100 hrs | 0 hrs | 1.2 | 0 hrs | 100 hrs |
| Current | 200 mA | 100 hrs | 0 hrs | 1.2 | 0 hrs | 100 hrs |
| Temp | 40 C. | 50 hrs | 50 hrs | 1.2 | 60 hrs | 110 hrs |
| RPM | 10000 RPM | 100 hrs | 0 hrs | 1.2 | 0 hrs | 100 hrs |
| Humidity | 50% | 100 hrs | 0 hrs | 1.2 | 0 hrs | 100 hrs |
| (Other) | (Other threshold) | (Other value) | (Other value) | (Other factor) | (Other value) | (Other value) | wherein Char can be a characteristic, such as an operational characteristic, environmental characteristic, or other characteristic, associated with a device (e.g., device 102), Thresh can be a threshold value that can be associated with the characteristic, Usage within Thresh can be the amount of time that the device or component thereof has been operating within the applicable threshold value associated with the characteristic, Usage beyond Thresh can be the amount of time that the device or component thereof has been operating beyond (e.g., outside of) the applicable threshold value associated with the characteristic, Acc Factor can be an acceleration factor that can be applied to a data value (e.g., amount of hours) that the device or component thereof has been determined to be operating beyond the applicable threshold value associated with the characteristic, Acc Usage can be an acceleration usage (e.g., accelerated amount of usage) that can be applied to the device or component thereof to indicate an accelerated or effective amount of time of usage of the device or component thereof that can take into account the wear and tear on the device or component due to being operating beyond the applicable threshold value associated with the characteristic, Total Usage can represent the total amount or effective amount of usage of the device or component that can take into account any accelerated usage associated with the device or component thereof, V can be volts, hrs can be hours, mA can be milliamps, Temp can be temperature, and C can be degrees in Celsius.

As can be observed from TABLE 1, while usage of the device 102 with regard to most characteristics (e.g., LTPFs, such as voltage, current, RPM, and humidity) associated with the device 102 is within the respective threshold values applicable to the device 102 during 100 hours of usage of the device 102, with regard to temperature of the device 102, the DHMC 112 determined that the device 102 was operating within the threshold temperature value for 50 hours of usage and was operating beyond (e.g., outside of) the threshold temperature value for 50 hours of usage. The life expectancy component 206 also can determine that the acceleration factor associated with the temperature characteristic can be 1.2. Accordingly, the life expectancy component 206 can determine that the accelerated usage associated with the temperature characteristic can be 60 hours (e.g., 50 hours of usage of the device 102 multiplied by the acceleration factor of 1.2), even though the runtime usage of the device 102 was 50 hours where the temperature was beyond the threshold temperature value. Accordingly, in this example from TABLE 1, the life expectancy component 206 can determine that the total usage associated with the device 102, or component thereof, with regard to the temperature characteristic can be 110 hours, which can account for the accelerated usage resulting from the temperature being determined to be beyond the threshold temperature value, even though the runtime usage of the device, or component thereof, was 100 hours. The life expectancy component 206 can take the accelerated usage relating to the temperature characteristic and associated with the device 102, or component thereof, into account as part of the determination of the remaining usable life of the device 102, or component thereof, such as described herein.

It is to be appreciated and understood that the threshold values and the acceleration factors in the example TABLE 1 are merely example values, and the respective threshold values and respective acceleration factors associated with respective characteristics can have different values from those values in TABLE 1 and can depend in part on a type of device, a type of component of device, quality of the component or device, ratings associated with the component, device, or characteristic, the effect (e.g., the amount of wear and tear) that accelerated usage with regard to a characteristic has on the component or device, and/or other factors.

In some embodiments, there can be multiple threshold values and multiple acceleration factors associated with respective characteristics associated with the device 102, or component thereof. For instance, with regard to each desired characteristic, the DHMC 112 can employ a first threshold value associated with a first acceleration factor, a second threshold value associated with a second acceleration factor, and/or another threshold value(s) associated with another acceleration factor(s). In certain embodiments, the first threshold value can be, or can be determined based at least in part on, the rated or normal value associated with the characteristic, and the second or other threshold values can be higher (or alternatively, lower, when appropriate) than the first threshold value. Also, the second acceleration factor typically can be a higher value than the first acceleration factor, and/or the other acceleration factor (if any) typically can be higher than the second acceleration factor and the first acceleration factor. Employing multiple threshold values and multiple acceleration factors associated with the characteristics can take into account that the further a measured value associated with a characteristic is over the rated or normal value (e.g., the first threshold value) associated with the characteristic, the more accelerated the wear and tear on the device 102, or component thereof, can be. If and when multiple threshold values and multiple acceleration factors are utilized with regard to a characteristic, the DHMC 112 (e.g., the life expectancy component 206 of the DHMC 112) can apply the first acceleration factor if the measured value is higher than the first threshold value and lower than the second threshold value, can apply the second acceleration factor if the measured value is higher than the second threshold value and lower than the other (e.g., third) threshold value, and/or can apply the other (e.g., third) acceleration factor if the measured value is higher than the other threshold value (and lower than another (e.g., fourth) higher threshold value, if there is such another higher threshold value).

In certain embodiments, the DHMC 112, employing an insertion/removal tracker component 208, can track insertion and/or removal of the device 102 into or from the entity 104 or other entity, and can include or incorporate information (e.g., the count of) relating to the insertion and/or removal of the device 102 into or from the entity 104 or other entity as part of the determination of the remaining usable life of the device 102, or component thereof. Insertion and/or removal of the device 102 into or from the entity 104 or other entity, by connecting or disconnecting a connector component of the device 102 to or from the entity 104 or other entity, can cause wear and tear on the connector component of the device 102. If the device 102 is inserted (e.g., plugged or seeded) into a connector or chassis of the entity 104 or other entity, the insertion/removal tracker component 208 can sense or detect that the device 102 has been inserted into a connector or chassis of the entity 104 or other entity. In some embodiments, the insertion/removal tracker component 208 can determine whether online insertion removal (OIR) logic associated with the device 102 has been detected to facilitate determining whether the device 102 has been inserted into a connector or chassis of the entity 104 or other entity. If the insertion/removal tracker component 208 determines that the OIR logic is not detected, the insertion/removal tracker component 208 can determine that the device 102 has not been fully or properly inserted, and the device 102 can again be inserted into the connector or chassis of the entity 104 or other entity.

In response to the insertion/removal tracker component 208 determining that the device 102 has been inserted into a connector or chassis of the entity 104 or other entity (e.g., the OIR logic has been detected), the insertion/removal tracker component 208 can read the insertion count associated with the device 102 from the data store 114. The insertion/removal tracker component 208 can increment the insertion count associated with the device 102 by one to generate an updated insertion count. The insertion/removal tracker component 208 can store the updated insertion count associated with the device 102 in the data store 114.

The insertion count (e.g., updated insertion count) can be utilized by the DHMC 112 to facilitate determining an amount of wear and tear on the device 102, and/or an amount (e.g., expected or predicted amount) of remaining usable life of the device 102, due to insertion and removal of the device 102 to or from the entity 104 or other entity. For instance, the device 102 can have a rated or maximum number of cycles of inserting and/or removing the device 102 to or from the entity 104 or other entity. The life expectancy component 206 can determine (e.g., calculate or compute) the remaining life expectancy (e.g., remaining usable life) of the device 102 based at least in part on (e.g., as a function of) the insertion count (also referred to as insertion/removal count), as updated or current, and the rated or maximum number of cycles of inserting and/or removing the device 102. For example, life expectancy component 206 can determine the life expectancy (in remaining number of cycles) as being equal to the rated or maximum number of cycles minus the insertion/removal count in cycles, or can determine the life expectancy (in percentage) as being equal to the remaining number of insertion/removal cycles (e.g., the rated or maximum number of cycles minus the insertion/removal count in cycles) divided by the rated or maximum number of cycles).

As a non-limiting example, TABLE 2 presents an example relating to remaining life expectancy of the device 102 based at least in part on remaining operational time and/or insertion/removal count.

wherein Life Expectancy can be a percentage value that can be representative of the remaining usable life of the device 102 with respect to the associated characteristic (e.g., total operational time, or insertion/removal count), Desired Alarm Threshold can be the amount (e.g., percentage) of remaining usable life of the device 102 with regard to the associated characteristic at or under which an alarm or notification indicating a relatively low amount of remaining usable life of the device 102 has been detected, Total Operational Time can relate to the amount of runtime or operational time of the device 102 with accelerated usage (if any) taken into account, Insertion/Removal Count can be the number of times (e.g., the number of cycles) that the device 102 has been inserted to and/or removed from the entity 104 or other entity, hrs can be hours, Max/Rated Value can be the expected, predicted, rated, normal, or maximum value with regard to the total operation time or the insertion/removal count associated with the device 102, and Current Usage Value can be the current amount of usage of the device 102 with regard to operational time or insertion/removal of the device 102, wherein, with regard to the Current Usage Value, accelerated usage (if any) can be taken into account.

As can be observed from TABLE 2, with regard to Total Operational Time, the life expectancy component 206 can determine the life expectancy of the device 102 to be 78% (e.g., 110 hours/500 hours=78%), and with regard to Insertion/Removal Count, the life expectancy component 206 can determine the life expectancy of the device 102 to be 75% (e.g., (200 cycles−50 cycles)/200 cycles=75%). The current usage value (or total usage) of 110 hours can be based at least in part on 100 hours of operational time of the device 102, plus accelerated usage of 10 hours for the device 102, as indicated or determined from the previous example with regard to TABLE 1. Since neither the life expectancy value associated with the Total Operational Time and the life expectancy value associated with the Insertion/Removal Count are at or below the Desired Alarm Threshold value of 10%, the DHMC 112 does not have to communicate or present an alarm or notification (e.g., low remaining life expectancy alarm or notification) relating to life expectancy to a user or other entity.

In accordance with various embodiments, the device 102 can comprise an interface component (I/F) 116 that can present (e.g., display, communicate, or emit) information relating to the health of the device 102 to the user or other entity. Such information can comprise a remaining usable life of the device 102, a remaining usable life of each desired component (e.g., component(s) 348, 350, and/or 352) of the device 102, an insertion/removal count associated with the device 102, respective data values (e.g., measured or determined data values) relating to respective characteristics (e.g., operational, environmental, or other characteristics) associated with the device 102, and/or other information relating to the device 102. In some embodiments, the interface component 116 can comprise light-emitting diodes (LEDs), such as bar LEDs that can be utilized to present

TABLE 2

|  | Max/Rated Value | Current Usage Value | Life Expectancy | Desired Alarm Threshold |
|---|---|---|---|---|
| Total Operational Time | 500 hrs | 110 hrs | 78% | 10% |
| Insertion/Removal Count | 200 cycles | 50 cycles | 75% | 10% | desired information relating to the health of the device 102. In certain embodiments, the interface component 116 can comprise a graphical display screen, a liquid-crystal display (LCD) screen, an organic LED (OLED) screen, or other type of display screen that can be utilized to present desired information relating to the health of the device 102.

In some embodiments, the interface component 116 can comprise one or more buttons, controls, and/or menus that be utilized to facilitate selection of which information relating to the health of the device 102 is to be presented and presentation of desired information relating to the health of the device 102. For instance, the interface component 116 can comprise or a button or control that can be pressed or manipulated by the user to facilitate presentation of information relating to the health of the device 102. In response to the user pressing the button or control, the interface component 116 can present desired information relating to the health of the device 102 via the group of LEDs (e.g., the bar LEDs), graphical display screen, LCD screen, OLED screen, or other type of display screen. If one or more menus are employed, in response to a user manipulating (e.g., pressing, turning, or adjusting) one or more buttons or controls, the interface component 116 can present a desired menu of the one or more menus and/or can enable the user to move or scroll through different portions of the desired menu, wherein respective (e.g., different) portions of the menu can be associated with, and facilitate presentation of, respective portions of the information relating to the health of the device 102. In certain embodiments, the interface component 116 can comprise an audio interface, haptic interface, and/or other desired interface to facilitate presenting device health-related information associated with the device 102 as an output (e.g., to the user).

In certain embodiments, the interface component 116, can present device health-related information as an output regardless of whether the interface component 116 is receiving electrical power from a battery source of the device 102 or an external power source (e.g., the entity 104). For instance, if the device 102 is not receiving power (e.g., is not connected to an external power source and does not have any internal power available due to not having an internal power source, such as a battery or due to the battery not having power available), the interface component 116, which can comprise an electronic ink (e-ink) display screen, can present device health-related information and/or other information associated with the device 102 via the e-ink display screen, where such device health-related information and/or other information can be maintained by the e-ink display screen (e.g., can continue to be displayed by the e-ink display screen), even if the e-ink display screen is not receiving any power. The device health-related information and/or other information can be, for example, the last information that was presented by the e-ink display screen when the interface component 116 last had power.

Figure 4:
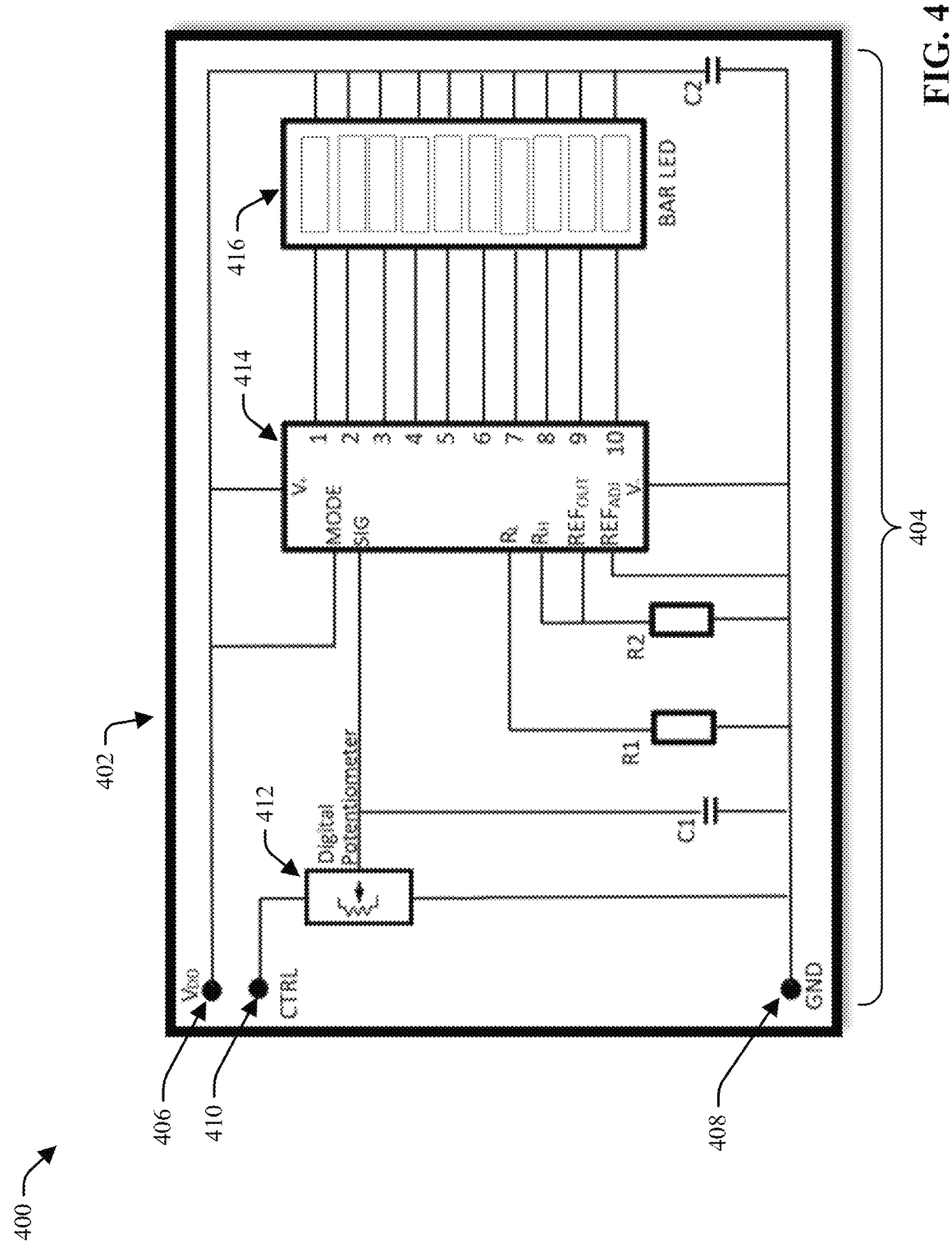
FIG. 4 depicts a diagram of a non-limiting example interface component that can present desired information, including notifications and/or device health-related information, relating to the device, in accordance with various aspects and embodiments of the disclosed subject matter.

Referring to FIG. 4 (along with FIGS. 1-3), FIG. 4 depicts a diagram of a non-limiting example interface component 400 that can present (e.g., display) desired information, including notifications and/or device health-related information, relating to the device 102, in accordance with various aspects and embodiments of the disclosed subject matter. The interface component 400 can correspond to some embodiments of the interface component 116 of FIG. 1.

The example interface component 400 can comprise a display and notification module 402 that can comprise electronic circuitry 404, which can include various electronic components. The display and notification module 402 can comprise a $V_{DD}$ pin 406 that can be connected to a voltage source of the device 102 (e.g., FRU) that can provide a desired (e.g., suitable, wanted, or optimal) voltage to the $V_{DD}$ pin 406, and a ground (GND) pin 408 that can be connected to a ground element of the device 102 that can provide a suitable ground for the electronic circuitry 404. The display and notification module 402 also can comprise a control (CTRL) pin 410, a digital potentiometer component 412, an integrated circuit (IC) chip 414, and a group of LEDs 416 that can comprise a desired number of LEDs (e.g., 10 LEDs or another desired number of LEDs) that can be in the form of a bar (e.g., bar LEDs). In some embodiments, the IC chip 414 can be a bar or dot display driver that can have respective pins (e.g., respective output pins) that can be associated with respective LEDs of the group of LEDs 416, and can be utilized to drive desired LEDs of the group of LEDs 416 to facilitate presentation of a data value(s).

The control pin 410 can be driven by a readout from the data store 114 that can, in turn, control the digital potentiometer component 412 to generate desired (e.g., appropriate, suitable, or optimal) power that can be provided as a signal to the IC chip 414 (e.g., to the signal (SIG) pin of the IC chip 414) to drive the group of LEDs 416 to cause some or all of the LEDs of the group of LEDs 416 to light up (e.g., light up or illuminate in a desired color) to correspond to the device health-related data value (e.g., remaining usable life of the device 102) determined by the DHMC 112 and stored in the data store 114. In some embodiments, a button (e.g., a push button) can be employed to energize the electronic circuitry 404 and display a current usage reading (e.g., remaining usable life of the device 102 or other desired device health-related information), in response to pressing or manipulating the button. In certain embodiments, if the device 102 is plugged into the chassis of the entity 104, the device 102 can receive or draw power from the chassis. In some embodiments, if the device 102 is not plugged into the chassis of the entity 104, the electronic circuitry 404 can comprise or be associated with (e.g., electrically connected to) a battery source (e.g., a battery) that can supply offline power to the electronic circuitry 404 and/or other components of the device 102.

The digital potentiometer component 412 can comprise a built-in non-volatile memory that can store the last position of the digital potentiometer component 412 before it was powered down, wherein the last position of the digital potentiometer component 412 can correspond to or represent the last data value (e.g., remaining usable life of the device 102 or other device health-related data value) read out of the data store 114. Storing the last position of the digital potentiometer component 412 in the built-in memory can enable the device 102 (e.g., via the interface component 400) to display its usage and life expectancy statistics (e.g., remaining usable life of the device 102 or other device health-related data value) even when the device 102 is not plugged into the chassis of the entity 104.

Figure 5:
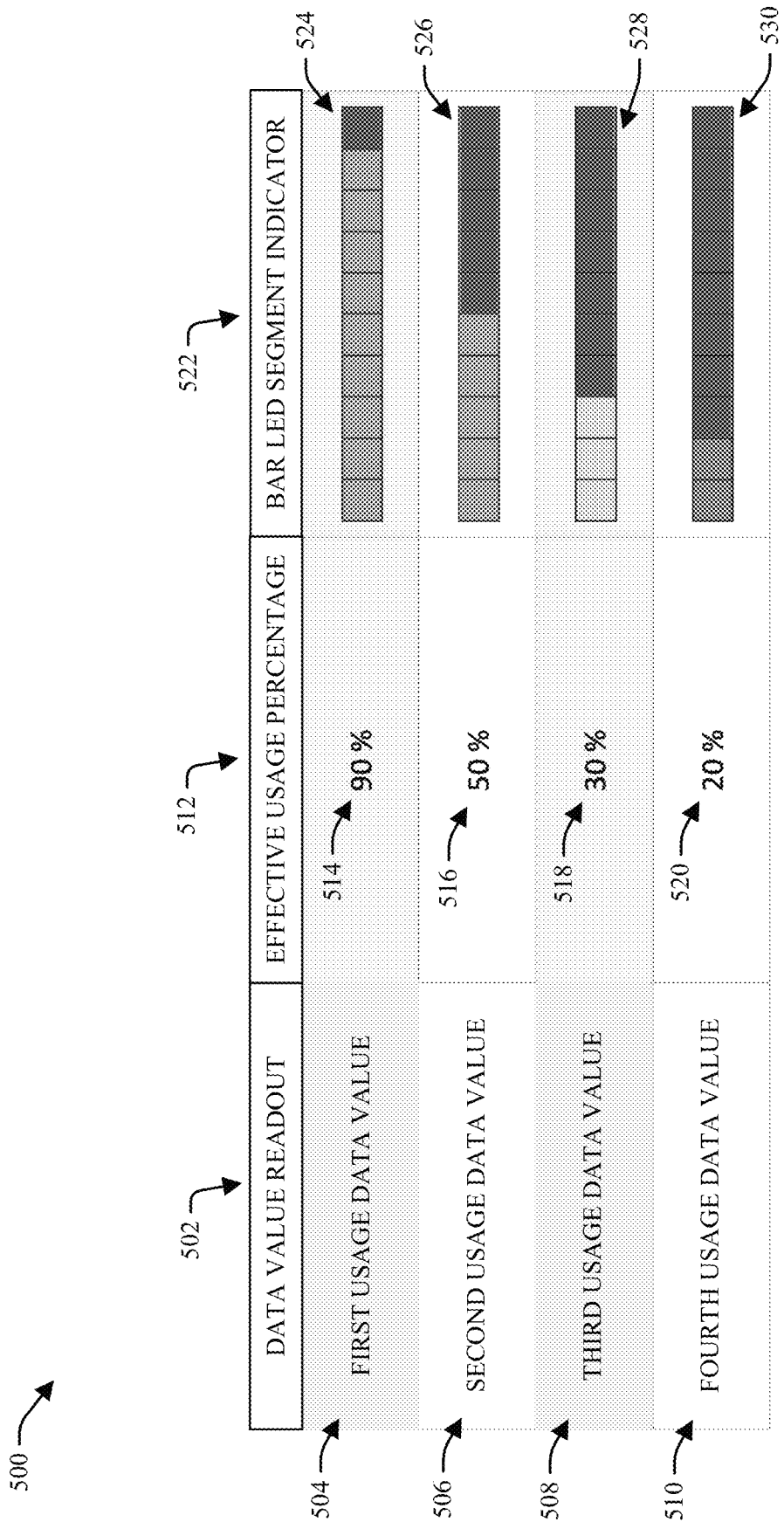
FIG. 5 presents a diagram of a non-limiting example table comprising example device usage values and their corresponding bar light-emitting diode (LED) output, in accordance with various aspects and embodiments of the disclosed subject matter.
Figure 6:
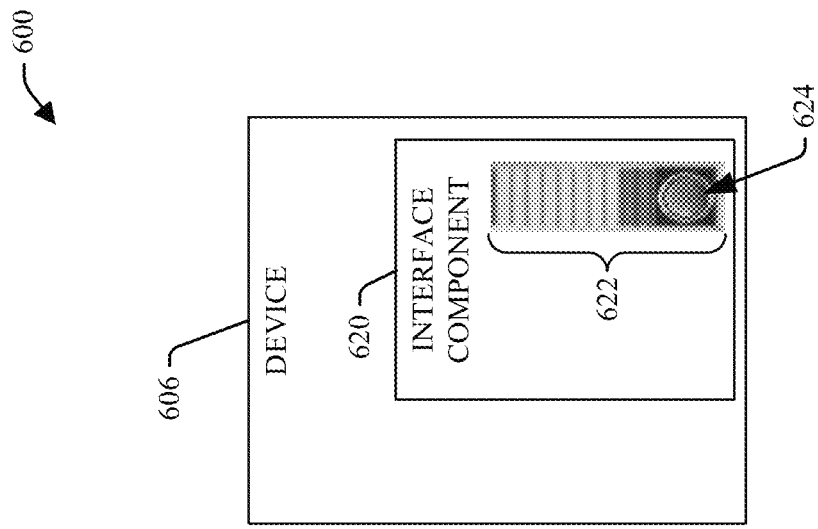
FIG. 6 illustrates a diagram of non-limiting example devices that can comprise interface components, including bar LEDs, incorporated into sides or facades of the devices, in accordance with various aspects and embodiments of the disclosed subject matter.
Figure 6:
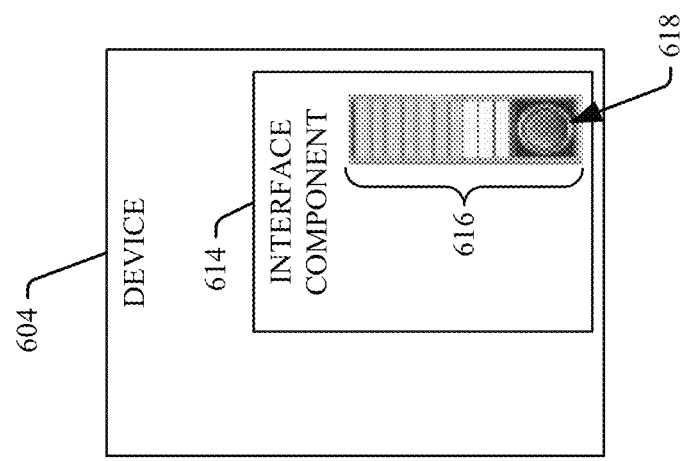
Figure 6:
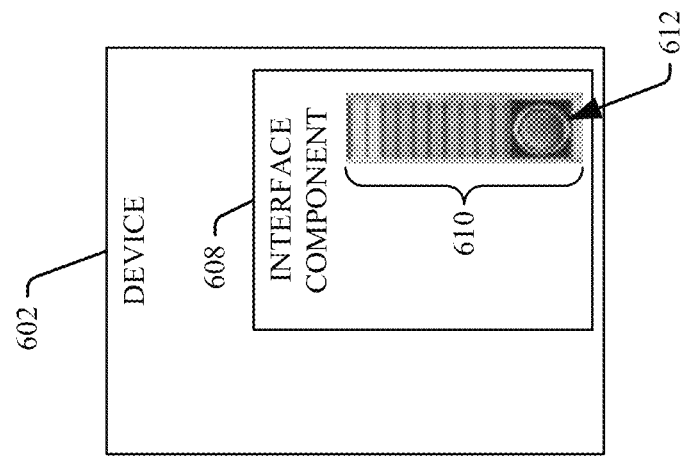

Referring briefly to FIGS. 5 and 6 (along with FIGS. 1-4), FIG. 5 presents a diagram of a non-limiting example table 500 comprising example device usage values and their corresponding bar LED output, and FIG. 6 illustrates a diagram of non-limiting example devices 600 that can comprise interface components, including bar LEDs, incorporated into sides or facades of the devices, in accordance with various aspects and embodiments of the disclosed subject matter. With regard to the table 500, the table 500 can comprise example data value readout 502 (e.g., usage data values), including a first usage data value 504, a second usage data value 506, a third usage data value 508, and a fourth usage data value 510, that may be read out of the data store 114 at various times. The respective usage data values (e.g., 504, 506, 508, and 510) can relate or correspond to, or can represent, respective amounts of remaining usable life of the device 102 or other respective device health-related statistics of the device 102.

The table 500 also can comprise an effective usage percentage 512 that can indicate a percentage indicating an effective remaining usage available for the device 102. With regard to the effective usage percentage 512, there can be a first effective usage percentage 514 (e.g., 90%) that can correspond to the first usage data value 504, a second effective usage percentage 516 (e.g., 50%) that can correspond to the second usage data value 506, a third effective usage percentage 518 (e.g., 30%) that can correspond to the third usage data value 508, and a fourth effective usage percentage 520 (e.g., 20%) that can correspond to the fourth usage data value 510.

The table 500 also can comprise bar LED segment indicator 522 that can correspond to the effective usage percentage 512, wherein the bar LED segment indicator can indicate a number of LEDs of the bar LEDs (e.g., group of LEDs) that are illuminated and/or the color (e.g., green, yellow, or red) of the illuminated LEDs to facilitate indicating or representing the usage data value read out of the data store 114. With regard to the bar LED segment indicator 522, there can be a first bar LED segment indicator 524 that can indicate nine LEDs illuminated in the color green, which can correspond to the first effective usage percentage 514 (e.g., 90%) and the first usage data value 504, a second bar LED segment indicator 526 that can indicate five LEDs illuminated in the color green, which can correspond to the second effective usage percentage 516 (e.g., 50%) and the second usage data value 506, a third bar LED segment indicator 528 that can indicate three LEDs illuminated in the color yellow, which can correspond to the third effective usage percentage 518 (e.g., 30%) and the third usage data value 508, and a fourth bar LED segment indicator 530 that can indicate two LEDs illuminated in the color red, which can correspond to the fourth effective usage percentage 520 (e.g., 20%) and the fourth usage data value 510. When the LEDs are green in color, this can indicate that the device health-related statistic (e.g., remaining usable life of the device 102 or other device health-related statistic) is in a good or excellent device health usage range. When the LEDs are yellow in color, this can indicate that the device health-related statistic is in a moderate or acceptable device health usage range that can be lower than the good or excellent range. When the LEDs are red in color, this can indicate that the device health-related statistic is in a low device health usage range that can be even lower than the moderate or acceptable range, and can indicate that the device 102 is nearing the end of its remaining usable life.

With regard to FIG. 6, the example devices 600 (e.g., FRUs) can comprise a first device 602, a second device 604, and a third device 606. The first device 602 can comprise an interface component 608 that can be part of or incorporated into a side of façade of the first device 602. The interface component 608 can comprise an LED bar 610 and a button 612. When the button 612 is pressed or manipulated (e.g., by the user), the LED bar 610 can illuminate none, some, or all of the LEDs of the LED bar 610 to correspond to or be representative of the device health-related data value (e.g., remaining usable life of the first device 602 or other device health-related data value) that was read out of the data store of the first device 602. In this example instance, the LED bar 610 can show eight of the ten LEDs illuminated in a green color, which can indicate, for example, an effective usage percentage of 80%, or other desired device health-related statistic, in a good or excellent range for the first device 602.

The second device 604 can comprise an interface component 614 that can be part of or incorporated into a side of facade of the second device 604. The interface component 614 can comprise an LED bar 616 and a button 618. When the button 618 is pressed or manipulated (e.g., by the user), the LED bar 616 can illuminate none, some, or all of the LEDs of the LED bar 616 to correspond to or be representative of the device health-related data value (e.g., remaining usable life of the second device 604 or other device health-related data value) that was read out of the data store of the second device 604. In this example instance, the LED bar 616 can show three of the ten LEDs illuminated in a yellow color, which can indicate, for example, an effective usage percentage of 30%, or other desired device health-related statistic, in a moderate or acceptable range for the second device 604.

The third device 606 can comprise an interface component 620 that can be part of or incorporated into a side of façade of the third device 606. The interface component 620 can comprise an LED bar 622 and a button 624. When the button 624 is pressed or manipulated (e.g., by the user), the LED bar 622 can illuminate none, some, or all of the LEDs of the LED bar 622 to correspond to or be representative of the device health-related data value (e.g., remaining usable life of the third device 606 or other device health-related data value) that was read out of the data store of the third device 606. In this example instance, the LED bar 622 can show two of the ten LEDs illuminated in a red color, which can indicate, for example, an effective usage percentage of 20%, or other desired device health-related statistic, in a low device health usage range for the third device 606.

Figure 7:
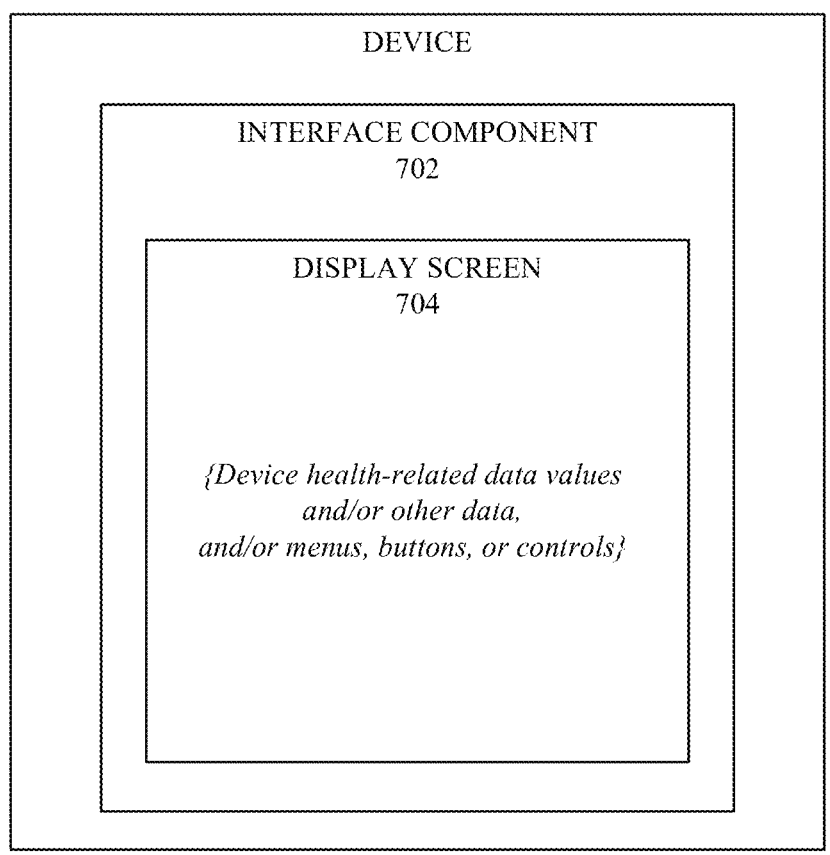
FIG. 7 depicts a block diagram of a non-limiting example device that can comprise an interface component that can include a display screen, such as a graphical display screen, liquid-crystal display (LCD) screen, organic LED (OLED) display screen, or other type of display screen that can present device health-related information and/or other desired information, in accordance with various aspects and embodiments of the disclosed subject matter.

Referring briefly to FIG. 7 (along with FIGS. 1-4), FIG. 7 depicts a block diagram of a non-limiting example device 700 that can comprise an interface component that can include a display screen, such as a graphical display screen, LCD screen, OLED display screen, or other type of display screen that can present (e.g., display) device health-related information and/or other desired information, in accordance with various aspects and embodiments of the disclosed subject matter. The example device 700 can comprise an interface component 702 that can comprise a display screen 704 of a desired size (e.g., dimensions, such as length and width) and shape (e.g., square, rectangle, circular, or other desired shape). In some embodiments, the display screen 704 can be a touch screen display. In other embodiments, the display screen 704 may not have touch screen functionality. The display screen 704 can present (e.g., display or emit) device health-related data values (e.g., remaining usable life of the device 700 or other device health-related data values or statistics) associated with the device 700, notification, alert, or alarm messages or indicators, menus, buttons, and/or controls to the user. The user can interact with the display screen 704 and/or buttons or controls associated therewith to access one or more menus relating to device health-related statistics and/or to access desired device health-related data values associated with the device 700. For example, if the user selects a remaining usable life statistic via manipulation of a button or control (e.g., the user, via the manipulation of the button or control, selects the remaining usable life statistic from a menu of various items of device health-related statistics), a remaining usable life data value can be read out of the data store of the device 700 and can be presented on the display screen 704 to the user.

With further regard to FIGS. 1-3 and determining usage (e.g., actual usage), including accelerated usage, of the device 102, or components thereof, in some embodiments, as disclosed, when determining (e.g., calculating or computing) the total usage time for a particular device (e.g., FRU), the DHMC 112 (e.g., life expectancy component 206 of the DHMC 112) not only can aggregate the actual usage time with regard to the device (e.g., 102), but also the accelerated usage time with regard to the device, for example, using the formula expressed in Equation (Eq.) (1) referenced below or another desired formula or equation. Use of the device under accelerated conditions (e.g., condition beyond normal or rated usage) can be known to wear out the components of the device faster than the components of the device are operated under or subject to normal or rated usage or conditions. The formula of Eq. (1) also can introduce a weight factor that can be used to influence a device component's significance (e.g., criticality) in the overall life expectancy prediction of the device. Eq. (1) can be as follows:

$$TotalUT_{sys} = ActualUT_{sys} + \sum\nolimits_{c=1}^{n}((UT_{stress}*Af*W) - UT_{stress})_c, \quad \text{(Eq. (1))}$$

wherein $TotalUT_{sys}$ can be an equivalent usage time of the device (e.g., device 102), which can be adjusted for acceleration (e.g., accelerated usage of the device 102) and weight (e.g., weight associated with the device 102 or a component or characteristic (e.g., LTPF) thereof), $ActualUT_{sys}$ can be actual or real operation time (e.g., actual or real usage time) of the device (e.g., 102), $UT_{stress}$ can be accelerated or stressed operation time (e.g., accelerated usage time) of a component of the device, Af can be an acceleration factor that can be applied for the component of the device (such as more fully described herein), c can indicate or correspond to each of the components {1 to n} of the device, and W can be a weight factor that can be associated with (e.g., applied with respect to) the component of the device, wherein the weight factor can be a multiplier that can be associated with (e.g., attached or applied to) each attribute (e.g., operational, environmental, or other characteristic) associated with the device, or component thereof, to desirably influence its relative importance in the overall life expectancy determination or prediction (as compared to or relative to other attributes associated with the device, or component thereof). In accordance with some embodiments, the weight factor associated with a component can be (e.g., often or typically can be) a multiplier factor that can be set to 1, although, in other embodiments, the weight factor associated with a component can be set to a value that can be greater than or less than 1. The acceleration factor Af can be, can comprise, and/or can be determined based at least in part on (e.g., as a function of) one or more acceleration factors (e.g., current acceleration factor, voltage acceleration factor, thermal or temperature acceleration factor, humidity acceleration factor, or other desired acceleration factor) that can be associated with a component(s) of the device 102, such as described herein or as otherwise desired. The DHMC 112 can analyze sensor data and/or other data, and based at least in part on the results of such analysis, can determine the $ActualUT_{sys}$ and $UT_{stress}$, such as described herein. The DHMC 112 can perform other determinations or calculations, in accordance with Eq. (1), to determine the $TotalUT_{sys}$.

In accordance with various embodiments, the DHMC 112 can utilize certain desired formulae to determine (e.g., calculate or compute) a component failure rate of a component of the device (e.g., 102) based at least in part on the factors or characteristics referenced above. Once the failure rate is known or determined by the DHMC 112, the DHMC 112 (e.g., the life expectancy component 206 of the DHMC 112) can determine, calculate, predict, or approximate the useful life remaining for the device (e.g., FRU) based at least in part on the determined failure rate of a component of the device or the device overall. It is noted that it may not be feasible to obtain all of the factors or characteristics associated with a device (e.g., it may not be possible to obtain a dust level value associated with a device, even though it certainly can impact the performance of device components, such as fans of a device), although the DHMC 112 can still determine various device health-related statistics associated with the device based at least in part on any data relating to the factors or characteristics associated with the device that the DHMC 112 can obtain. It also is noted that EMI can impact (e.g., negatively impact) the efficiency of transformers and other electric components of a device. The undesirable effect of EMI can be reduced or minimized with proper grounding. It further is noted that the vibration factor may be less common in a data-center environment but can be notable for a device (e.g., FRU) used in automotive or portable data devices. Most of the factors listed above can be retried from registers or data storage of the device, based at least in part on runtime data and can be used to calculate the fault-rate.

In some embodiments, the DHMC 112 can determine the device fault rate of the device (e.g., 102) using (e.g., applying) Eq. (2), or another desired equation for determining device fault rate. Eq. (2) can be as follows:

$$ft_{sys} = \sum\nolimits_{c=1}^{n}\left(ft_{comp}*w\right)_c, \quad \text{(Eq. (2))}$$

wherein $ft_{sys}$ can be a fault rate of the device (e.g., FRU), $ft_{comp}$ can be a fault rate of a component inside the device, w can be a weight factor (e.g., a multiplier factor) that can be associated with (e.g., attached or applied to) the component of the device, and c can indicate or correspond to each of the number of components {1 to n} of the device.

In certain embodiments, the DHMC 112 can determine the component fault rate for each desired component (e.g., 348, 350, and/or 352) of the device (e.g., 102) using (e.g., applying) Eq. (3), or another desired equation for determining component fault rate. Eq. (3) can be as follows:

$$ft_{comp} = ft_{ref}*Af_i*Af_v*Af_t*Af_h*Af_{tc}*(\text{and/or other acc factor}) \quad \text{(Eq. (3))}$$

wherein $ft_{comp}$ can be a fault rate of a component inside the device 102, $ft_{ref}$ can be a component fault rate of a component of the device 102 at reference (e.g., ideal or other reference) conditions, $Af_i$ can be a current acceleration factor for (e.g., applicable with respect to) the component, $Af_v$ can be a voltage acceleration factor for the component, $Af_t$ can be a temperature acceleration factor for the component, $Af_h$ can be a humidity acceleration factor for the component, $Af_{tc}$ can be a temperature cycling acceleration factor for the component, and the other acceleration factor (acc factor) can be another desired factor for the component. The DHMC 112 can analyze sensor data and/or other data, and based at least in part on the results of such analysis, can determine (e.g., calculate or compute) the respective $ft_{comp}$ for respective components of the device, and $ft_{sys}$, in accordance with Eq. (2) and Eq. (3).

In some embodiments, the DHMC 112 or another component can determine a current acceleration factor associated with (e.g., applicable to) the device (e.g., 102) using (e.g., applying) Eq. (4), or another desired equation for determining a current acceleration factor associated with the device. Eq. (4) can be as follows:

$$Af_i = \exp((E_2 - E_1)/\beta, \tag{Eq. (4)}$$

wherein $Af_i$ can be a current acceleration factor for (e.g., applicable with respect to) a (e.g., 348, 350, or 352) of the device (e.g., 102), $E_2$ and $E_1$ can be respective electric fields associated with the component, and $\beta$ can be a defined or known rate constant with respect to the current acceleration factor and this equation.

In certain embodiments, the DHMC 112 or another component can determine a voltage acceleration factor associated with (e.g., applicable to) the device (e.g., 102) using (e.g., applying) Eq. (5), or another desired equation for determining a voltage acceleration factor associated with the device. Eq. (5) can be as follows:

$$Af_v = e^{(V_s - V_o)\beta}, \tag{Eq. (5)}$$

wherein $Af_v$ can be a voltage acceleration factor associated with (e.g., applicable with respect to) a component (e.g., 348, 350, or 352) of the device (e.g., 102), $V_s$ can be an accelerated stress voltage (e.g., a voltage over a threshold, rated, or nominal voltage level) associated with (e.g., experienced by or applied to) the component, $V_o$ can be a typical operating voltage (e.g., a known, standard, or desired operating voltage), and $\beta$ can be a constant that can be associated with (e.g., applicable with respect to) the component (e.g., a known, defined, or experimentally determined constant value that can be based on dielectric integrity data associated with the component) and this equation.

In some embodiments, the DHMC 112 or another component can determine a thermal or temperature acceleration factor associated with (e.g., applicable to) the device (e.g., 102) using (e.g., applying) Eq. (6), or another desired equation for determining a thermal or temperature acceleration factor associated with the device. Eq. (6) can be as follows:

$$Af_t = e^{(E_a/k)(1/T_o - 1/T_s)}, \tag{Eq. (6)}$$

wherein $Af_t$ can be a temperature acceleration factor associated with (e.g., applicable with respect to) a component (e.g., 348, 350, or 352) of the device (e.g., 102), $T_s$ can be an accelerated stress temperature (e.g., a temperature, as measured in Kelvin temperature, over a threshold, rated, or nominal temperature, in Kelvin), $T_o$ can be a typical operating temperature (e.g., a known, standard, or desired operating temperature), $E_a$ can be an activation energy (e.g., in electronvolts (eV)), and k can be Boltzmann's constant (e.g., $8.617e^{-5}$ eV/Kelvin).

In certain embodiments, the DHMC 112 or another component can determine a humidity acceleration factor associated with (e.g., applicable to) the device (e.g., 102) using (e.g., applying) Eq. (7), or another desired equation for determining a humidity acceleration factor associated with the device. Eq. (7) can be as follows:

$$Af_h = e^{\alpha(RH_s - RH_n)}, \tag{Eq. (7)}$$

wherein $Af_h$ can be a humidity acceleration factor (e.g., applicable with respect to) a component (e.g., 348, 350, or 352) of the device (e.g., 102), $RH_s$ can be a relative humidity of stress that can be associated with the component, $RH_n$ can be a normal relative humidity that can be associated with the component, $\alpha$ can be a constant value associated with the component (e.g., a known, defined, or experimentally determined constant value that can be applied with respect to the component).

With further regard to the device controller component 108 of the entity 104 and/or the controller component 110 of the device 102, in accordance with various embodiments, the device controller component 108 and/or the controller component 110 each can be or can comprise a processor component that can include can work in conjunction with the other components (e.g., CPU 106 and/or DHMC 112 of the entity 104; and/or DHMC 112, data store 114, and/or interface component 116 of the device 102) to facilitate performing the various respective functions of the entity 104 or device 102, respectively. The processor component can employ one or more processors (e.g., one or more CPUs), microprocessors, or controllers that can process information relating to data, files, sensor and/or LTPF data, device health-related statistics or data values, rated, nominal, or maximum data values relating to characteristics (e.g., LTPF, operational, environmental, and/or other characteristics) associated with the device, time periods for determining device health-related statistics or data values, acceleration factors, life expectancy data values or predictions associated with the device, device or component fault rates, interfaces, notifications, alarms, alerts, read operations, write operations, data storage operations, data or file search operations, operating systems, hardware or virtual platforms, preferences (e.g., user or client preferences), applications, services, hash values, metadata, parameters, traffic flows, policies, defined device health management criteria, algorithms (e.g., device health management algorithms, hash algorithms, data compression algorithms, data decompression algorithms, and/or other algorithm), protocols, tools, and/or other information, to facilitate operation of the entity 104 or device 102, and control data flow between the entity 104 and the device 102 and/or other components (e.g., another entity or another device) associated with the entity 104 or the device 102.

With further regard to the data store 114, the data store 114 can store data structures (e.g., user data, metadata), code structure(s) (e.g., modules, objects, hashes, classes, procedures) or instructions, information relating to data, files, sensor and/or LTPF data, device health-related statistics or data values, rated, nominal, or maximum data values relating to characteristics (e.g., LTPF, operational, environmental, and/or other characteristics) associated with the device, time periods for determining device health-related statistics or data values, acceleration factors, life expectancy data values or predictions associated with the device, device or component fault rates, interfaces, notifications, alarms, alerts, read operations, write operations, data storage operations, data or file search operations, operating systems, hardware or virtual platforms, preferences (e.g., user or client preferences), applications, services, hash values, metadata, parameters, traffic flows, policies, defined device health management criteria, algorithms (e.g., device health management algorithms, hash algorithms, data compression algorithms, data decompression algorithms, and/or other algorithm), protocols, tools, and/or other information, to facilitate controlling or performing operations associated with the device 102. The data store 114 can comprise volatile and/or non-volatile memory, such as described herein. In an aspect, the controller component 110 can be functionally coupled (e.g., through a memory bus) to the data store 114 in order to store and retrieve information desired to operate and/or confer functionality, at least in part, to the DHMC 112, data store 114, interface component 116, and/or another component, and/or substantially any other operational aspects of the device 102.

It should be appreciated that the data store 114 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 8:
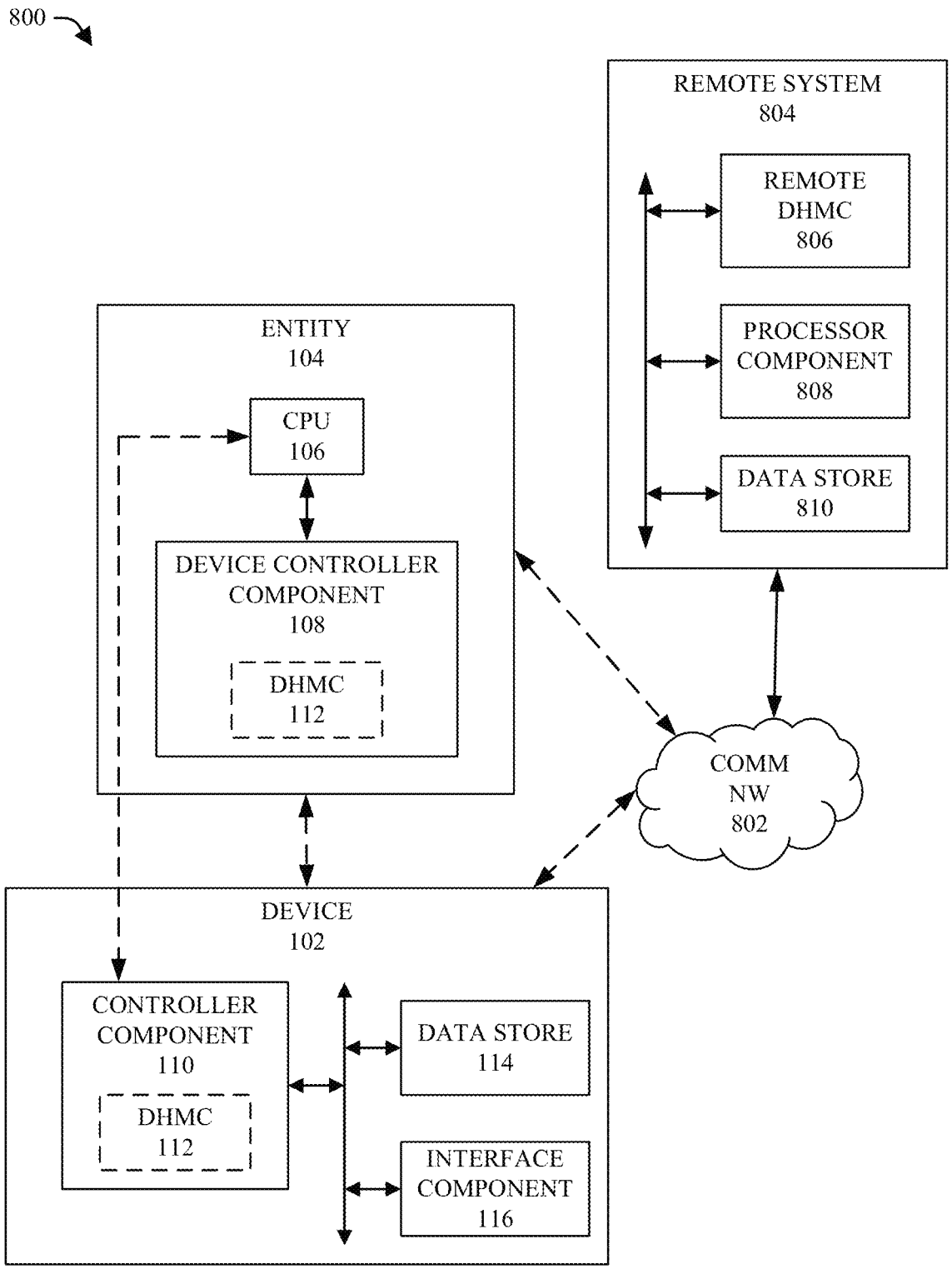
FIG. 8 illustrates a block diagram of a non-limiting example system that can offload device health-related data relating to the device and/or other desired data from the DHMC of or associated with the device to a remote DHMC of a remote system, in accordance with various aspects and embodiments of the disclosed subject matter.

Turning to FIG. 8 (along with FIG. 1), FIG. 8 illustrates a block diagram of a non-limiting example system 800 that can offload device health-related data relating to the device and/or other desired data from the DHMC of or associated with the device to a remote DHMC of a remote system, in accordance with various aspects and embodiments of the disclosed subject matter. The system 800 can comprise the device 102 and a DHMC 112 that can be part of or associated with the device 102, such as described herein. The system 800 also can comprise a communication network (COMM NW) 802 with which the device 102 and/or DHMC 112 can be communicatively connected at various times. The communication connection between the communication network 802 and the device 102 and/or DHMC 112 can be a wireline or wireless communication connection that can be established using desired wireline or wireless communication technologies and protocols.

The system 800 further can comprise a remote system 804 that can comprise a remote DHMC 806, a processor component 808, and a data store 810, wherein the remote system 804 can be communicatively connected to the communication network 802 to facilitate communication of information (e.g., device health-related data or statistics associated with the device 102 and/or other desired data) between the DHMC 112 (and/or device 102) and the remote DHMC 806. The communication connection between the remote system 804 and the communication network 802 can be a wireline or wireless communication connection that can be established using desired wireline or wireless communication technologies and protocols.

The remote DHMC 806 can comprise all or a desired portion of the functionality, and can perform same or similar analysis on data (e.g., sensor, telemetric, or other data relating to the device 102) and determinations relating to the health of the device (e.g., usage or accelerated usage of the device 102, remaining usable life of the device 102, and/or other device health determinations), as the DHMC 112 can perform, such as described herein, and/or can perform further or more in depth analysis (e.g., artificial intelligence (AI)-based or machine learning (ML)-based analysis) on such data beyond the analysis performed by the DHMC 112 to further enhance determinations or predictions relating to the health of the device 102.

In some instances, the DHMC 112 and/or device 102 may not be able to be in communication with the remote system 804 or other systems or devices via the communication network 802, for example, to enable desirable (e.g., wanted, needed, or optimal) security of the DHMC 112, the device 102, the entity 104, and/or the data stored therein, and/or due to the unavailability of a communication connection between the communication network 802 and the DHMC 112 and/or device 102. The DHMC 112 can perform desired operations and store data, such as described herein, while the DHMC 112 is not connected to the communication network 802. In some embodiments, when the DHMC 112 and/or device 102 is connected to the communication network 802, the DHMC 112 can communicate desired information (e.g., device health-related data or statistics and/or other data) relating to the device 102 to the remote DHMC 806 for storage in the data store 810 of the remote system 804 and/or for further analysis by the remote DHMC 806 and/or the processor component 808. In certain embodiments, if and as desired, while the DHMC 112 is connected to the remote DHMC 806 via the communication network 802, the DHMC 112 can offload some or all of the analysis of data (e.g., sensor, telemetric, or other data relating to the device 102) and device health-related determinations to the remote DHMC 806, which can perform some or all of the analysis of such data and make device health-related determinations on behalf of the DHMC 112, and can communicate information relating to the device health-related determinations (e.g., remaining usable life of the device 102, or individual component thereof, usage or accelerated usage of the device 102, or individual component thereof, and/or other device health-related determinations or data) to the DHMC 112 for storage in the data store 114.

In certain embodiments, the remote DHMC 806 can communicate software or firmware updates, instructions, and/or other desired information to the DHMC 112 via the communication network 802. The DHMC 112 can update its software or firmware based at least in part on the software or firmware updates, and/or can perform certain operations based at least in part on (e.g., corresponding to) the received instructions.

With further regard to the remote DHMC 806 and AI-based or ML-based analysis, in accordance with various embodiments, in connection with or as part of an AI-based or ML-based analysis, the remote DHMC 806 can employ, build (e.g., construct or create), and/or import, AI and/or ML techniques and algorithms, AI and/or ML models, neural networks (e.g., trained neural networks), and/or graph mining to render and/or generate predictions, inferences, calculations, prognostications, estimates, derivations, forecasts, detections, and/or computations that can facilitate determining device health-related data, determining a remaining usable life of a device (e.g., FRU) or component thereof, determining a threshold value to apply with respect to a characteristic (e.g., operational, environmental, or other characteristic, and/or LTPF) or a device, determining a data value associated with a characteristic, determining accelerated usage associated with a characteristic, a device, or a component of the device, determining an acceleration factor to apply with respect to a characteristic, a device, or a component of the device, determining a weight to apply with respect to a characteristic, a device, or component of the device, and/or automating one or more functions or features of the disclosed subject matter (e.g., automating one or more functions or features of or associated with the DHMC 112, the interface component 116, the remote DHMC 806, or other component).

The remote DHMC 806 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the remote DHMC 806 can examine the entirety or a subset of the data (e.g., sensor data associated with characteristics associated with the device 102; ratings or maximum data values associated with characteristics associated with the device 102, or components thereof; device-related data; data relating to acceleration factors; data relating to weight factors; or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 9-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 9:
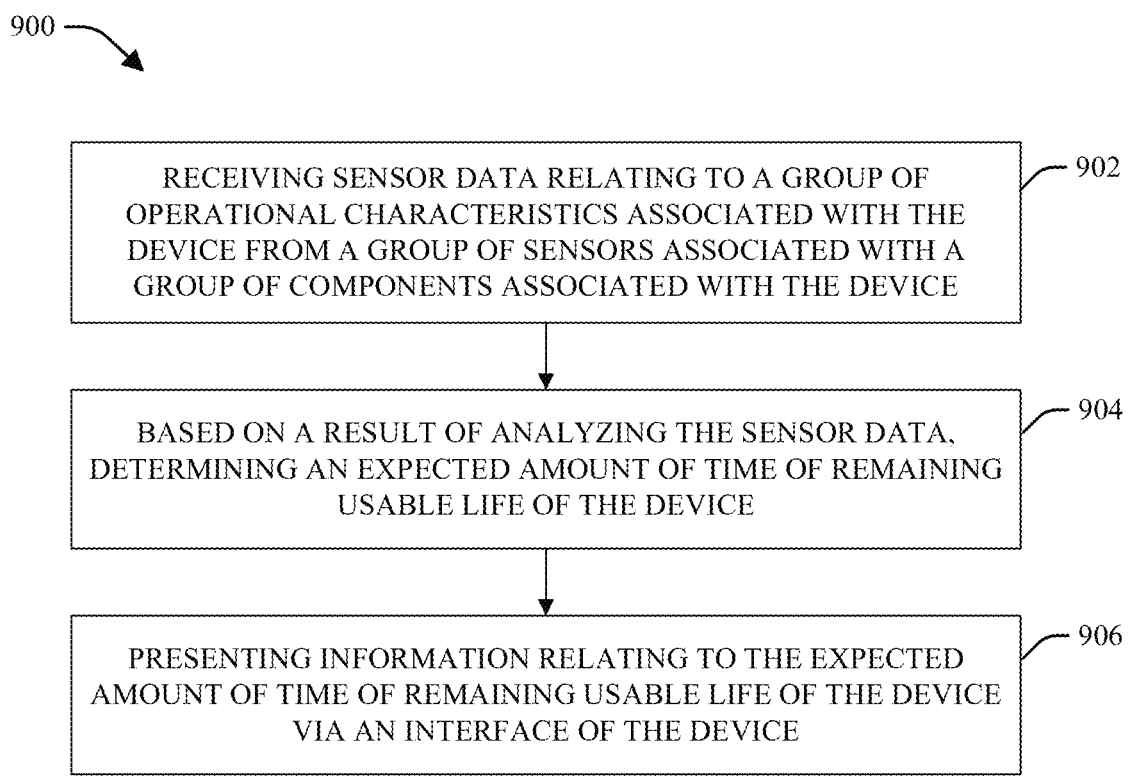
FIG. 9 illustrates a flow chart of an example method that can desirably manage and/or present data relating to the health and/or remaining usable life of a device, in accordance with various aspects and embodiments of the disclosed subject matter.

FIG. 9 illustrates a flow chart of an example method 900 that can desirably (e.g., suitably, efficiently, or optimally) manage and/or present data relating to the health and/or remaining usable life of a device, in accordance with various aspects and embodiments of the disclosed subject matter. The method 900 can be employed by, for example, a system comprising the DHMC, a processor component (e.g., of or associated with the DHMC), and/or data store (e.g., of or associated with the DHMC and/or the processor component).

At 902, sensor data relating to a group of operational characteristics associated with the device can be received from a group of sensors associated with a group of components associated with the device. Respective sensors of the group of sensors can sense respective conditions relating to respective operational characteristics of or associated with respective components of or associated with the device (e.g., FRU), and, based at least in part on the sensing, can produce sensor data (e.g., respective items of sensor data relating to the respective conditions), such as described herein. The operational characteristics can comprise characteristics relating to operation of the device, environmental characteristics associated with the device, and/or other characteristics associated with the device. The device (e.g., a DHMC of the device) can receive the sensor data from the group of sensors. The DHMC can analyze the sensor data to facilitate determining usage of the respective components (e.g., since the last time the DHMC determined or measured usage of the respective components) and/or the respective conditions associated with the respective components associated with the device, which the DHMC can utilize to facilitate determining respective remaining usable life of the respective components individually, and determining the remaining usable life of the device (e.g., based at least in part on the aggregate of the remaining usable life of the respective components).

At 904, based at least in part on a result of analyzing the sensor data, an expected amount of time of remaining usable life of the device can be determined. Based at least in part on the result of analyzing the sensor data, the DHMC can determine the expected or predicted amount of time of remaining usable life of the device, such as described herein.

At 906, information relating to the expected amount of time of remaining usable life of the device can be presented via an interface of the device. The DHMC can facilitate or initiate presentation, via the interface, of the information relating to the expected amount of time of remaining usable life of the device. In some embodiments, the DHMC can facilitate or initiate the presentation, via the interface, of such information regardless of whether the interface is receiving electrical power. For instance, if the device is not receiving power (e.g., is not connected to an external power source and does not have any internal power available), the interface, which can comprise an e-ink display, can present such information via the e-ink display, where such information can be maintained by the e-ink display (e.g., can continue to be displayed by the e-ink display), even if the e-ink display is not receiving any power.

Figure 10:
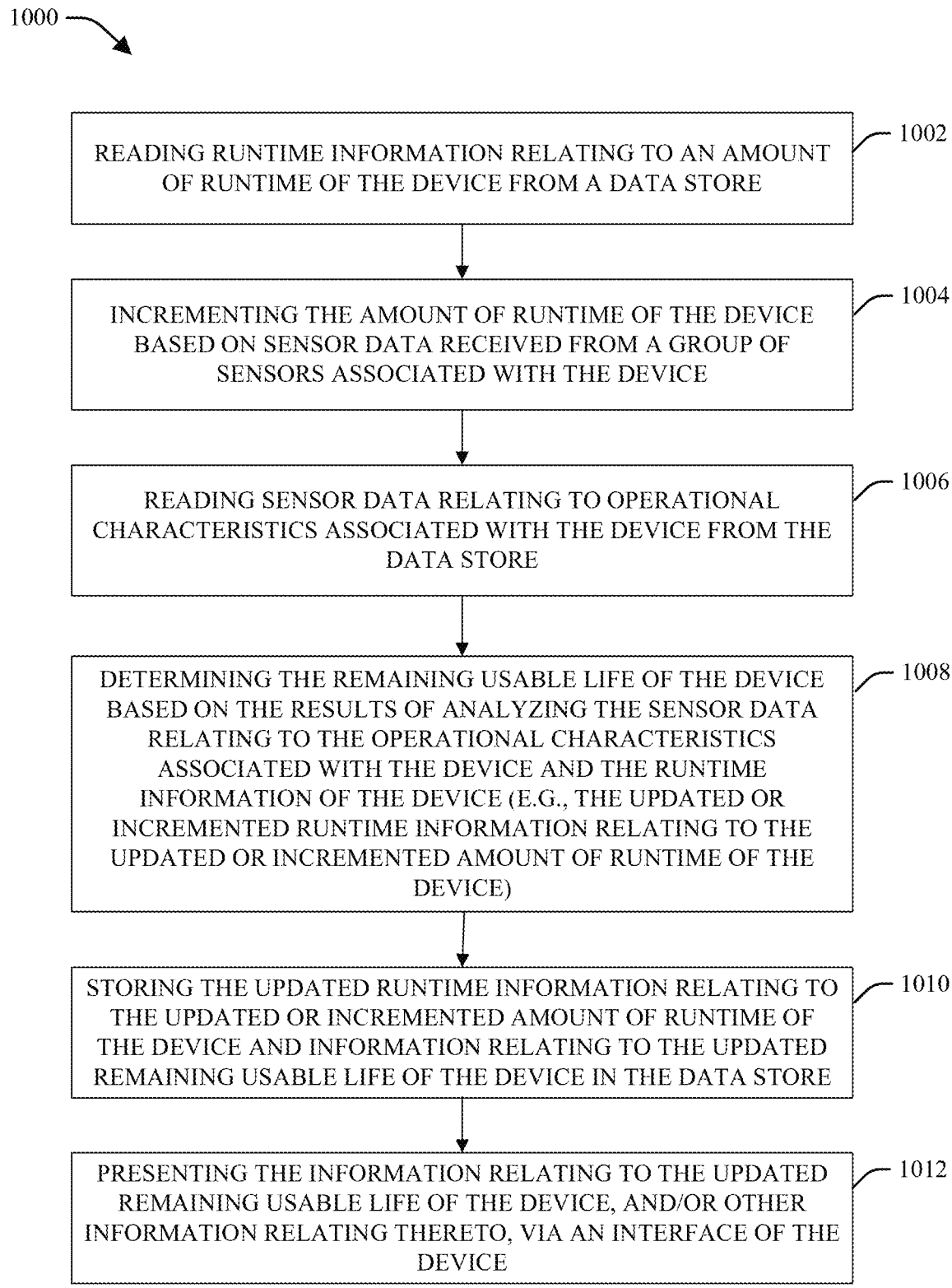
FIG. 10 presents a flow chart of another example method that can desirably manage and/or present data relating to the health and/or remaining usable life of a device, in accordance with various aspects and embodiments of the disclosed subject matter.

FIG. 10 presents a flow chart of another example method 1000 that can desirably (e.g., suitably, efficiently, or optimally) manage and/or present data relating to the health and/or remaining usable life of a device, in accordance with various aspects and embodiments of the disclosed subject matter. The method 1000 can be employed by, for example, a system comprising the DHMC, a processor component (e.g., of or associated with the DHMC), and/or data store (e.g., of or associated with the DHMC and/or the processor component).

At 1002, runtime information relating to an amount of runtime of the device can be read from a data store. Periodically (e.g., each hour or at the end of each interval of a desired time length) or dynamically (e.g., dynamically in response to an event or a request), the DHMC can read the runtime information relating to the amount of runtime of the device (e.g., FRU) from the data store associated with the device. This runtime information can indicate the amount of runtime of the device, since the last time the amount of runtime of the device was determined or calculated and stored in the data store.

At 1004, the amount of runtime of the device can be incremented based at least in part on sensor data received from a group of sensors associated with the device. The DHMC can increment the amount of runtime of the device based at least in part on the result of analyzing the sensor data received from the group of sensors (e.g., sensor data received since the last time the amount of runtime of the device was determined or calculated).

At 1006, sensor data relating to the operational characteristics associated with the device can be read from the data store. The DHMC can read other sensor data (e.g., LTPF data) relating to the operational characteristics (e.g., voltage, current, temperature, RPMs, humidity, and/or other desired characteristics) associated with the device (e.g., beyond the sensor data indicating the amount of runtime of the device).

At 1008, the remaining usable life of the device can be determined based at least in part on the results of analyzing the sensor data relating to the operational characteristics associated with the device and the runtime information of the device (e.g., the updated or incremented runtime information relating to the updated or incremented amount of runtime of the device). The DHMC can determine (e.g., calculate) the remaining usable life (e.g., an expected or predicted amount of time of usable life remaining or life expectancy) of the device based at least in part on the results of analyzing the sensor data relating to the operational characteristics associated with the device and the runtime information of the device, such as described herein. As part of such determination of the remaining usable life (e.g., the updated remaining usable life) of the device, the DHMC can determine and take into account any accelerated conditions associated with any operational characteristic or component associated with the device, such as described herein.

At 1010, the updated runtime information relating to the updated or incremented amount of runtime of the device and information relating to the updated remaining usable life of the device can be stored in the data store. The DHMC can store the updated runtime information and the information relating to the updated remaining usable life of the device in the data store.

At 1012, the information relating to the updated remaining usable life of the device, and/or other information relating thereto, can be presented via an interface of the device. The DHMC can facilitate or initiate presentation the information relating to the updated remaining usable life of the device, and/or the other information relating thereto (e.g., information relating to updated remaining usable life of respective components of the device, information relating to operational characteristics or conditions associated with the device, or a component(s) thereof, and/or other desired information), via the interface of the device, such as described herein.

Figure 11:
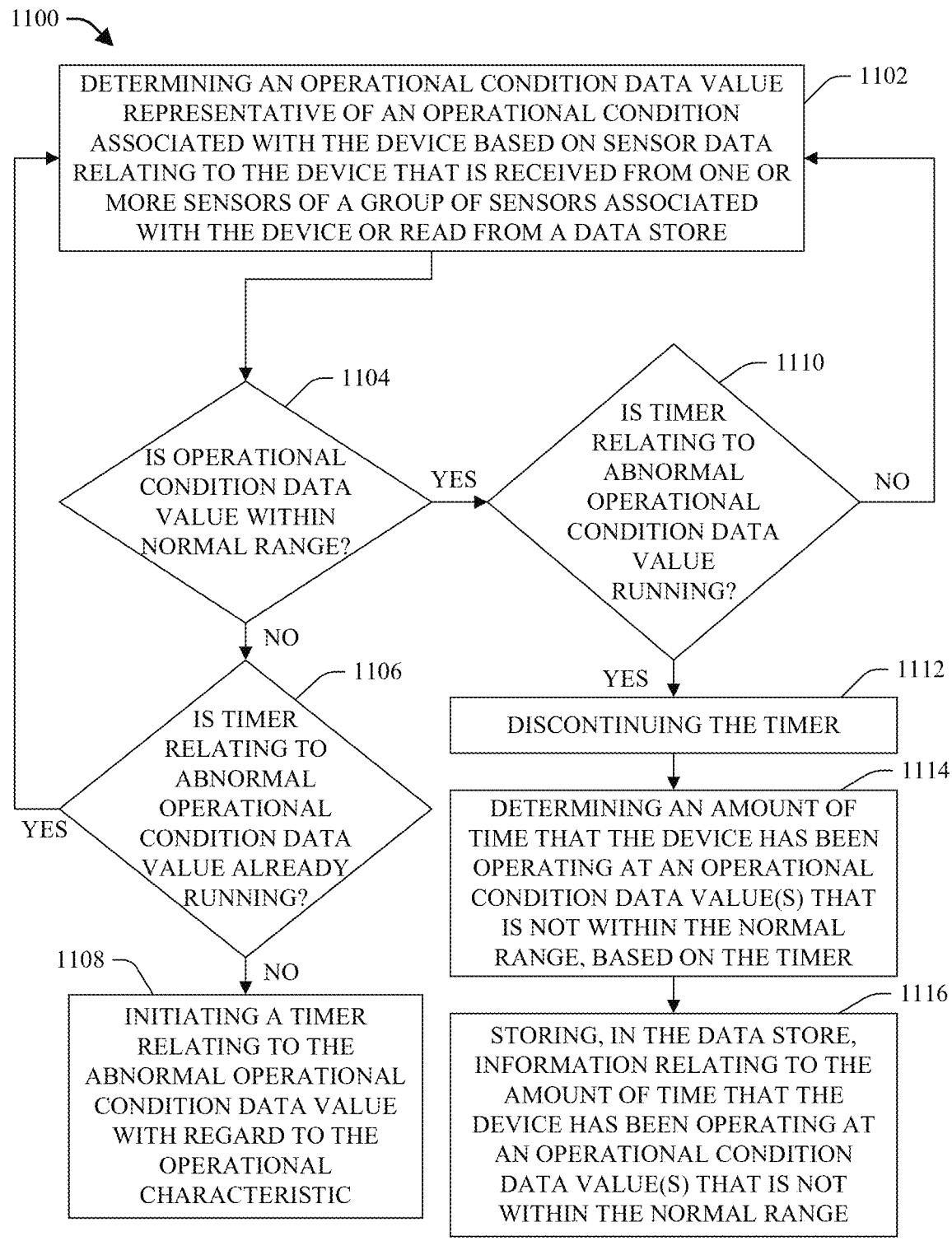
FIG. 11 depicts a flow chart of an example method that can desirably track, and collect data relating to, accelerated conditions associated with a device, in accordance with various aspects and embodiments of the disclosed subject matter.

FIG. 11 depicts a flow chart of an example method 1100 that can desirably (e.g., suitably, efficiently, or optimally) track, and collect data relating to, accelerated conditions associated with a device, in accordance with various aspects and embodiments of the disclosed subject matter. The method 1100 can be employed by, for example, a system comprising the DHMC, a processor component (e.g., of or associated with the DHMC), and/or data store (e.g., of or associated with the DHMC and/or the processor component).

At 1102, an operational condition data value representative of an operational condition associated with the device can be determined based at least in part on sensor data relating to the device that is received from one or more sensors of a group of sensors associated with the device or read from a data store. The DHMC can receive the sensor data from the one or more sensors or can read the sensor data from the data store of the device, and can analyze the sensor data, which can relate to the operational condition relating to an operational characteristic (e.g., voltage, current, temperature, RPMs, humidity, and/or other desired operational, environmental, or other characteristics) associated with the device. The DHMC can determine the operational condition data value representative of the operational condition associated with the device based at least in part on the result of analyzing the sensor data.

At 1104, a determination can be made regarding whether the operational condition data value within a normal range with regard to the operational characteristic associated with the device. The DHMC can determine whether the operational condition data value (e.g., LTPF value) within the normal range with regard to the operational characteristic associated with the device based at least in part on the result of analyzing (e.g., comparing) the operational condition data value and information relating to (e.g., indicating or specifying) the normal range for the operational characteristic, which can be retrieved from the data store.

If it is determined that the operational condition data value is not within the normal range with regard to the operational characteristic, at 1106, a determination can be made regarding whether a timer relating to an abnormal (e.g., high) operational condition data value is already running with regard to the operational characteristic. If the DHMC determines that the operational condition data value is not within the normal range (e.g., is outside of, above (or below), or otherwise not within the normal range) with regard to the operational characteristic, the DHMC can determine whether a timer relating to an abnormal (e.g., high) operational condition data value is already running, or whether an amount of time relating to the abnormal operational condition data value is otherwise being tracked, with regard to the operational characteristic.

If it is determined that a timer relating to the abnormal operational condition data value is already running, or the amount of time relating to the abnormal operational condition data value is otherwise being tracked, with regard to the operational characteristic, the method 1100 can return to reference numeral 1102, where a next operational condition data value representative of the operational condition associated with the device can be determined based at least in part on the next sensor data relating to the device that is received from the one or more sensors or read from the data store, and the method 1100 can proceed from that point. If the DHMC determines that the timer relating to the abnormal operational condition data value is already running, or the amount of time relating to the abnormal operational condition data value is otherwise being tracked, with regard to the operational characteristic, the DHMC can determine, read, or sense the next operational condition data value representative of the operational condition associated with the device based at least in part on the next (e.g., newly received or read) sensor data relating to the device that is received from the one or more sensors or read from the data store, and the method 1100 can proceed from that point.

If, instead, at 1106, it is determined that a timer relating to the abnormal operational condition data value is not running, or the amount of time relating to the abnormal operational condition data value is not otherwise being tracked, with regard to the operational characteristic, at 1108, a timer relating to the abnormal operational condition data value with regard to the operational characteristic can be initiated (e.g., started). For instance, if the DHMC determines that a timer relating to the abnormal operational condition data value is not yet running, or the amount of time relating to the abnormal operational condition data value is not otherwise being tracked, with regard to the operational characteristic, the DHMC can initiate (e.g., start) a timer relating to the abnormal operational condition data value, or can otherwise initiate tracking of the amount of time relating to the abnormal operational condition data value, with regard to the operational characteristic. At this point, the method 1100 can return to reference numeral 1102, where a next operational condition data value representative of the operational condition associated with the device can be determined based at least in part on the next sensor data relating to the device that is received from the one or more sensors or read from the data store, and the method 1100 can proceed from that point.

Referring back to reference numeral 1104, if, at 1104, it is determined that the operational condition data value is within the normal range with regard to the operational characteristic, at 1110, a determination can be made regarding whether a timer relating to the abnormal operational condition data value is running, or the amount of time relating to the abnormal operational condition data value is otherwise being tracked, with regard to the operational characteristic. If the DHMC determine that the operational condition data value is within the normal range with regard to the operational characteristic, the DHMC can determine whether a timer relating to the abnormal operational condition data value is running, or the amount of time relating to the abnormal operational condition data value is otherwise being tracked, with regard to the operational characteristic.

If it is determined that a timer relating to the abnormal operational condition data value is not running, or the amount of time relating to the abnormal operational condition data value is not otherwise being tracked, with regard to the operational characteristic, the method 1100 can return to reference numeral 1102, where a next operational condition data value representative of the operational condition associated with the device can be determined based at least in part on the next sensor data relating to the device that is received from the one or more sensors or read from the data store, and the method 1100 can proceed from that point.

If, instead, it is determined that a timer relating to the abnormal operational condition data value is running, or the amount of time relating to the abnormal operational condition data value is otherwise being tracked, with regard to the operational characteristic, at 1112, the timer can be discontinued. If the DHMC determines that a timer relating to the abnormal operational condition data value is running, or the amount of time relating to the abnormal operational condition data value is otherwise being tracked, with regard to the operational characteristic, the DHMC can discontinue (e.g., cease, stop, or suspend) the timer, or can otherwise discontinue tracking any further amount of time relating to the operational condition, with regard to the operational characteristic.

At 1114, an amount of time that the device has been operating at an operational condition data value(s) that is not within the normal range can be determined based at least in part on the timer (e.g., the timer value or amount of time that has elapsed on the timer). Based at least in part on the timer or the tracking of time, the DHMC can determine (e.g., calculate or identify) the amount of time (e.g., runtime) that the device has been operating at the operational condition data value(s) that is not within the normal range for the operational characteristic.

At 1116, information relating to the amount of time that the device has been operating at an operational condition data value(s) that is not within the normal range can be stored in the data store. The DHMC can store the information relating to the amount of time that the device has been operating at an operational condition data value(s) that is not within the normal range in the data store of the device, wherein the information can comprise such amount of time, information indicating the operational characteristic (e.g., LTPF) with which such amount of time is associated, and/or other desired information (e.g., timestamp or other metadata, or other information relating to such amount of time).

Figure 12:
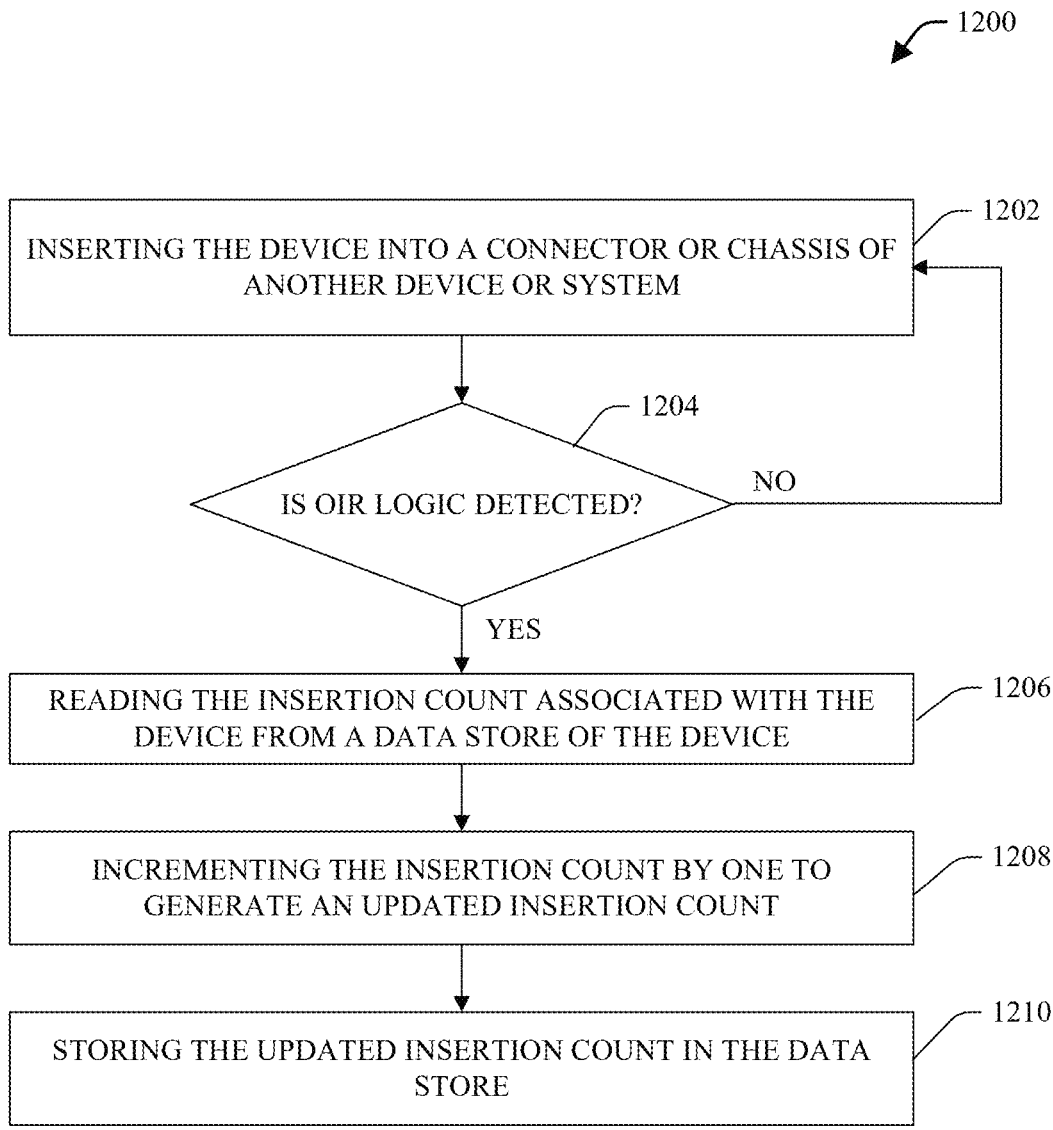
FIG. 12 illustrates a flow chart of an example method that can desirably track, and collect data relating to, insertion of a device into a connector or chassis of another device or system, in accordance with various aspects and embodiments of the disclosed subject matter.

FIG. 12 illustrates a flow chart of an example method 1200 that can desirably (e.g., suitably, efficiently, or optimally) track, and collect data relating to, insertion of a device into a connector or chassis of another device or system, in accordance with various aspects and embodiments of the disclosed subject matter. The method 1200 can be employed by, for example, a system comprising the DHMC, a processor component (e.g., of or associated with the DHMC), and/or data store (e.g., of or associated with the DHMC and/or the processor component).

At 1202, the device can be inserted (e.g., plugged or seeded) into a connector or chassis of another device or system. At 1204, a determination can be made regarding whether OIR logic associated with the device has been detected. The DHMC can determine whether the OIR logic associated with the device has been detected.

If it is determined that the OIR logic is not detected, the method 1200 can return to reference numeral 1202, where the device can again be inserted into the connector or chassis of the other device or system, and the method 1200 can proceed from that point. For instance, if the DHMC determines that the OIR logic is not detected, the DHMC can determine that the device has not been fully or properly inserted, and the device can again be inserted into the connector or chassis of the other device or system.

If, instead, it is determined that the OIR logic is detected, at 1206, the insertion count associated with the device can be read from a data store of the device. If the DHMC determines that the OIR logic is detected, the DHMC can read the insertion count associated with the device from the data store. At 1208, the insertion count can be incremented by one to generate an updated insertion count. The DHMC can increment the insertion count by one to generate the updated insertion count. At 1210, the updated insertion count can be stored in the data store. For instance, the DHMC can store the updated insertion count associated with the device in the data store. The updated insertion count can be utilized by the DHMC to facilitate determining an amount of wear and tear on the device, and/or an amount (e.g., expected or predicted amount) of remaining usable life of the device, due to insertion and removal of the device to or from another device or system, such as described herein.

Figure 13:
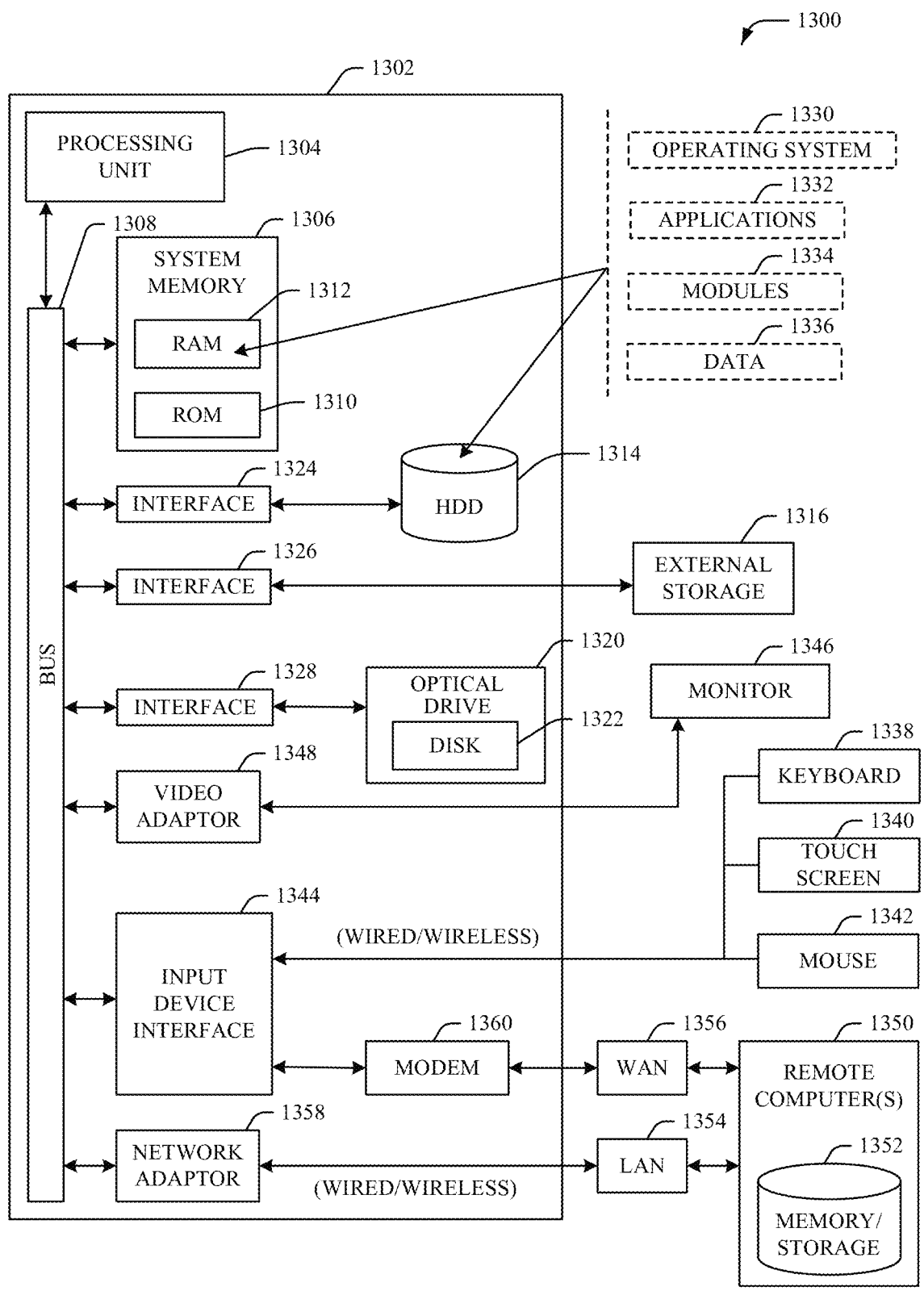
FIG. 13 illustrates an example block diagram of an example computing environment in which the various embodiments of the embodiments described herein can be implemented.

In order to provide additional context for various embodiments described herein, FIG. 13 and the following discussion are intended to provide a brief, general description of a suitable computing environment 1300 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356, e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHZ radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, entity, DHMC, interface component, device controller component, controller component, processor component, data store, communication network, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
receiving, by a device comprising at least one processor, sensor data relating to a group of operational characteristics of the device from a group of sensors associated with a group of components associated with the device;
based on a result of analyzing of the sensor data, determining, by the device, an amount of time that a component of the group of components associated with the device has been operating at or below a defined threshold operational limit or a defined threshold load limit associated with the component;
based on the result of analyzing the sensor data, determining, by the device, an expected amount of time of remaining usable life of the device; and
presenting, by the device, information relating to the expected amount of time of remaining usable life of the device via an interface of the device, independently of determining whether the interface is receiving electrical power.

2. The method of claim 1, wherein the determining of the expected amount of time of remaining usable life of the device comprises:
based on the result of the analyzing of the sensor data and based on the determining of the amount of time that the component has been operating at or below the defined threshold operational limit or the defined threshold load limit associated with the component, determining, by the device, the expected amount of time of remaining usable life of the device.

3. The method of claim 1, wherein the amount of time is a first amount of time, wherein the expected amount of time of remaining usable life of the device is a first expected amount of time of remaining usable life of the device, and wherein the method further comprises:

based on the result of the analyzing of the sensor data, determining, by the device, a second amount of time that the component has been operating above the defined threshold operational limit or the defined threshold load limit associated with the component;

determining, by the device, a third amount of time associated with the component as a function of the second amount of time, an acceleration factor, or a weight factor, wherein the third amount of time is representative of accelerated usage of the component from operating the component above the defined threshold operational limit or the defined threshold load limit; and determining, by the device, a second expected amount of time of remaining usable life of the component as a function of a defined amount of time of usable life of the component, the first amount of time, and the third amount of time.

4. The method of claim 3, further comprising:

based on the result of the analyzing of the sensor data, detecting, by the device, that the component is operating above the defined threshold operational limit or the defined threshold load limit associated with the component; and in response to the detecting, and based on the sensor data, tracking, by the device, the second amount of time the component has been operating above the defined threshold operational limit or the defined threshold load limit associated with the component.

5. The method of claim 1, further comprising:

based on the result of the analyzing of the sensor data, determining, by the device, respective expected amounts of time of remaining usable life of respective components of the group of components associated with the device, wherein the determining of the expected amount of time of remaining usable life of the device comprises determining the expected amount of time of remaining usable life of the device as a function of the respective expected amounts of time of remaining usable life of the respective components, or as a lowest expected amount of time of remaining usable life of a component of the respective components that is determined from the respective expected amounts of time of remaining usable life of the respective components.

6. The method of claim 1, further comprising:

based on the result of the analyzing of the sensor data, incrementing, by the device, an amount of operation time of the device to a next amount of operation time of the device from a previous amount of operation time of the device that was determined based on previous sensor data associated with the device, wherein the previous amount of operation time of the device is stored in and retrieved from a data store, wherein the determining of the expected amount of time of remaining usable life of the device comprises determining the expected amount of time of remaining usable life of the device as a function of a previous expected amount of time of remaining usable life of the device and a difference between the next amount of operation time of the device and the previous amount of operation time of the device, and wherein the previous expected amount of time of remaining usable life of the device is stored in and retrieved from the data store; and storing, by the device, the next amount of operation time of the device or the expected amount of time of remaining usable life of the device in the data store.

7. The method of claim 1, further comprising:

based on analyzing connection data received from a connection sensor, detecting, by the device, one or more instances in which a component of the group of components has been inserted into the device at one or more times, wherein the sensor data comprises the connection data, and wherein the group of sensors comprises the connection sensor;

based on the detecting, tracking, by the device, a number of instances that the component has been inserted into the device;

based on the tracking, determining, by the device, the number of instances that the component has been inserted into the device; and storing, by the device, the number of instances that the component has been inserted into the device in a data store, wherein the determining of the expected amount of time of remaining usable life of the device comprises determining the expected amount of time of remaining usable life of the device based on the number of instances that the component has been inserted into the device.

8. The method of claim 1, wherein the presenting comprises presenting, via the interface of the device, an indicator or a data value that indicates the expected amount of time of remaining usable life of the device.

9. The method of claim 1, wherein the presenting comprises presenting, via the interface of the device, respective indicators or respective data values that indicate respective operational characteristics relating to respective conditions of respective components of the group of components associated with the device.

10. The method of claim 1, wherein the presenting comprises: during a time in which the device is connected to a power source of the device or an external power source external to the device, presenting, by the interface of the device, the information relating to the expected amount of time of remaining usable life of the device.

11. The method of claim 1, wherein the presenting comprises: during a time in which the device is not connected to a power source, presenting, by the interface, comprising an electronic ink display, of the device, the information relating to the expected amount of time of remaining usable life of the device, and wherein the electronic ink display is able to maintain and display the information without the device being connected to the power source.

12. The method of claim 1, wherein the device is a field replaceable unit that is able to be associated with a computer device or a communication network device.

13. A device, comprising:

at least one memory that stores computer executable components; and at least one processor that executes computer executable components stored in the at least one memory, wherein the computer executable components comprise:

a device health manager that determines a predicted amount of time of remaining usable life of the device based on a result of an analysis of sensor information relating to a group of operational attributes of the device received from a group of sensors associated with a group of components associated with the device, wherein, to facilitate the determination of the predicted amount of time of remaining usable life of the device, the device health manager determines an amount of time that a component of the group of components has been operating at or below a defined threshold operational limit or a defined threshold load limit associated with the component based on the result of the analysis; and an interface that presents information relating to the predicted amount of time of remaining usable life of the device, independent of a determination of whether the device is connected to an external device that is external to the device.

14. The device of claim 13, wherein the device health manager determines respective predicted amounts of time of remaining usable life of respective components of the group of components associated with the device based on the result of the analysis of the sensor information, and wherein the device health manager determines the predicted amount of time of remaining usable life of the device based on the respective predicted amounts of time of remaining usable life of the respective components, or based on a lowest predicted amount of time of remaining usable life of the component of the respective components that is determined to be lower than other predicted amounts of time of remaining usable life of other components of the respective components.

15. The device of claim 14, wherein the amount of time is a first amount of time, wherein the predicted amount of time of remaining usable life of the device is a first predicted amount of time of remaining usable life of the device, wherein the device health manager determines a second amount of time that the component has been operating above the defined threshold operational limit or the defined threshold load limit associated with the component, wherein the device health manager determines a third amount of time associated with the component as a function of the second amount of time, an acceleration value, or a weight value, wherein the third amount of time is indicative of accelerated usage of the component from operating the component above the defined threshold operational limit or the defined threshold load limit, wherein the device health manager determines a second predicted amount of time of remaining usable life of the component as a function of a defined amount of time of usable life of the component, the first amount of time, and the third amount of time, and wherein the device health manager determines the first predicted amount of time of remaining usable life of the device based on the second predicted amount of time of remaining usable life of the component.

16. The device of claim 13, wherein, during a first time that the device is connected to a power source, or during a second time that the device is not receiving electrical power from any power source, the interface presents respective indicators or respective information values that indicate respective operational attributes relating to respective conditions of respective components of the group of components associated with the device, and wherein the interface comprises an electronic ink display that is able to maintain and display the respective indicators or the respective information values during the second time that the device is not receiving the electrical power.

17. The device of claim 13, wherein the group of sensors comprises a voltage sensor, a current sensor, a power sensor, a vibration sensor, an electromagnetic interference sensor, a frequency sensor, a temperature sensor, a humidity sensor, a revolution sensor, a connection sensor, or a particle sensor, and wherein the sensor information comprises voltage information received from the voltage sensor, current information received from the current sensor, power information received from the power sensor, vibration information received from the vibration sensor, electromagnetic interference information received from the electromagnetic interference sensor, frequency information received from the frequency sensor, temperature information received from the temperature sensor, humidity information received from the humidity sensor, revolution information received from the revolution sensor, connection information received from the connection sensor, or particle information received from the particle sensor.

18. The device of claim 13, wherein the device is a field replaceable unit that is able to be associated with a computer device or a network device, and wherein the field replaceable unit comprises a power supply unit, a fan tray unit, a fiber optic connector device, a network interface card, a data storage device, an electronic device, a mechanical device, or an electromechanical device.

19. A non-transitory machine-readable medium, comprising executable instructions that, when executed by at least one processor, facilitate performance of operations, comprising:

determining an amount of time during which a component associated with a field replaceable unit has been operating above a threshold operational limit or a threshold load limit associated with the component, based on a result of analyzing sensor information relating to a group of operational attributes of the field replaceable unit and obtained from a group of sensors associated with a group of components, comprising the component, associated with the field replaceable unit;

determining an expected amount of time of remaining operational life of the field replaceable unit based on the result of the analyzing and based on the amount of time; and displaying, via an interface of the field replaceable unit, information relating to the expected amount of time of remaining operational life of the field replaceable unit, regardless of whether the interface is receiving electrical power.

20. The non-transitory machine-readable medium of claim 19, wherein the amount of time is a second amount of time, wherein the expected amount of time of remaining operational life of the field replaceable unit is a first expected amount of time of remaining operational life of the field replaceable unit, and wherein the operations further comprise:

based on the result of the analyzing of the sensor information, determining a first amount of time during which a component of the group of components associated with the field replaceable unit has been operating at or below the threshold operational limit or the threshold load limit associated with the component;

determining a third amount of time associated with the component as a function of the second amount of time, an acceleration factor, or a weight factor, wherein the third amount of time is representative of accelerated usage of the component from operating the component above the threshold operational limit or the threshold load limit;

determining a second expected amount of time of remaining operational life of the component as a function of a defined amount of time of operational life of the component, the first amount of time, and the third amount of time; and
determining the first expected amount of time of remaining operational life of the field replaceable unit based on the second expected amount of time of remaining operational life of the component.

\* \* \* \* \*